(12) United States Patent
Kim

(10) Patent No.: US 11,172,351 B2
(45) Date of Patent: Nov. 9, 2021

(54) ELECTRONIC DEVICE AND METHOD FOR RESETTING SIM CARD

(71) Applicant: Samsung Electronics Co., Ltd., Suwon-si (KR)

(72) Inventor: Jaehong Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/096,715

(22) Filed: Nov. 12, 2020

(65) Prior Publication Data

US 2021/0144544 A1 May 13, 2021

(30) Foreign Application Priority Data

Nov. 12, 2019 (KR) .................. 10-2019-0144232

(51) Int. Cl.
*H04W 8/18* (2009.01)
*H04B 1/3818* (2015.01)
*G06F 1/24* (2006.01)

(52) U.S. Cl.
CPC .............. *H04W 8/183* (2013.01); *G06F 1/24* (2013.01); *H04B 1/3818* (2015.01)

(58) Field of Classification Search
CPC combination set(s) only.
See application file for complete search history.

(56) References Cited

U.S. PATENT DOCUMENTS

| 8,170,614 | B2 | 5/2012 | Kim |
| 8,554,276 | B2 | 10/2013 | Lin et al. |
| 10,021,544 | B2 | 7/2018 | Shi et al. |
| 2009/0163245 | A1* | 6/2009 | Oozeki ................. H04M 1/675 455/558 |
| 2012/0083316 | A1 | 4/2012 | Lee et al. |
| 2016/0029204 | A1* | 1/2016 | Lalwaney ............... H04W 8/22 455/418 |
| 2017/0214423 | A1 | 7/2017 | Park et al. |
| 2018/0046832 | A1* | 2/2018 | Lee ....................... G06F 3/0632 |
| 2019/0182954 | A1* | 6/2019 | Sirajudeen ....... G06K 19/07732 |
| 2020/0403341 | A1* | 12/2020 | Zhang .................. G06K 7/0026 |

FOREIGN PATENT DOCUMENTS

EP 2621244 B1 8/2019

OTHER PUBLICATIONS

International Search Report of the International Searching Authority in connection with International Application No. PCT/KR2020/015333 dated Jan. 29, 2021, 3 pages.

* cited by examiner

Primary Examiner — Junpeng Chen

(57) ABSTRACT

In certain embodiments, an electronic device may include a subscriber identification module (SIM) tray allowing at least one SIM card to be loaded in a row, a SIM detector detecting the at least one SIM card, and a processor operatively connected to the SIM detector. The processor may be configured to detect, through the SIM detector, an insertion of the SIM tray in which the at least one SIM card is loaded, to determine whether the insertion of the SIM tray is completed within a predetermined time, and to perform a SIM reset operation corresponding to the at least one SIM card in response to the completed insertion of the SIM tray. Other embodiments are possible.

20 Claims, 16 Drawing Sheets

ELECTRONIC DEVICE AND METHOD FOR RESETTING SIM CARD

CROSS-REFERENCE TO RELATED APPLICATION

This application is based on and claims priority under 35 U.S.C. 119 to Korean Patent Application No. 10-2019-0144232 filed on Nov. 12, 2019 in the Korean Intellectual Property Office, the disclosure of which is incorporated by reference herein in its entirety.

BACKGROUND

1. Field

The disclosure relates to an electronic device and method for resetting a subscriber identification module (SIM) card.

2. Description of Related Art

With the development of related technologies, a great variety of electronic devices capable of performing wireless communication and realizing portability, such as a mobile handset, a smart phone, and a tablet personal computer, have been released.

Normally, the electronic device that supports wireless communication has an ability to use a wireless communication service, provided by a communication service provider, through a subscriber identification module (SIM) card. In typical cases, the electronic device may have at least one SIM card.

The SIM card(s) may be loaded in a SIM tray, which may be inserted into the electronic device. The electronic device may detect whether the SIM tray is inserted. In addition, the electronic device may identify the SIM card(s) loaded in the SIM tray and provide a communication service corresponding to the identified SIM card(s) to a user.

The SIM tray may have a structure that allows a plurality of SIM cards to be loaded in series. That is, the SIM tray may have a serial structure in which the plurality of SIM cards are loaded in a row. When the SIM tray having the serial structure is inserted into the electronic device, the electronic device may detect the insertion of a first SIM card inserted first and sequentially detect the insertion of a second SIM card inserted thereafter.

SUMMARY

Various embodiments of the disclosure may provide an electronic device and method for identifying a complete insertion of a SIM tray having a serial structure and then performing a resetting operation for a plurality of SIM cards.

According to various embodiments, an electronic device may include a subscriber identification module (SIM) tray allowing at least one SIM card to be loaded in a row, a SIM detector detecting the at least one SIM card, and a processor operatively connected to the SIM detector. The processor may be configured to detect, through the SIM detector, an insertion of the SIM tray in which the at least one SIM card is loaded, to determine whether the insertion of the SIM tray is completed within a predetermined time, and to perform a SIM reset operation corresponding to the at least one SIM card in response to the completed insertion of the SIM tray.

According to various embodiments, a method of an electronic device may include detecting, through a subscriber identification module (SIM) detector, an insertion of a SIM tray in which at least one SIM card is loaded in a row, determining whether the insertion of the SIM tray is completed within a predetermined time, and performing a SIM reset operation corresponding to the at least one SIM card in response to the completed insertion of the SIM tray.

According to various embodiments, the electronic device may detect a completed insertion of a SIM tray in which at least one SIM card loaded, and may perform a reset operation for the at least one SIM card. Various embodiments may prevent malfunctions (e.g., an erroneous notification, a modem operation error, a data collision) of the electronic device due to an erroneous detection of an insertion state of a SIM card. In various embodiments, a reset operation is performed based on accurately recognizing the inserted SIM card, so that user convenience may be improved. Besides, there are various effects that are directly or indirectly understood through the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 14B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to the accompanying drawings.

Figure 1:
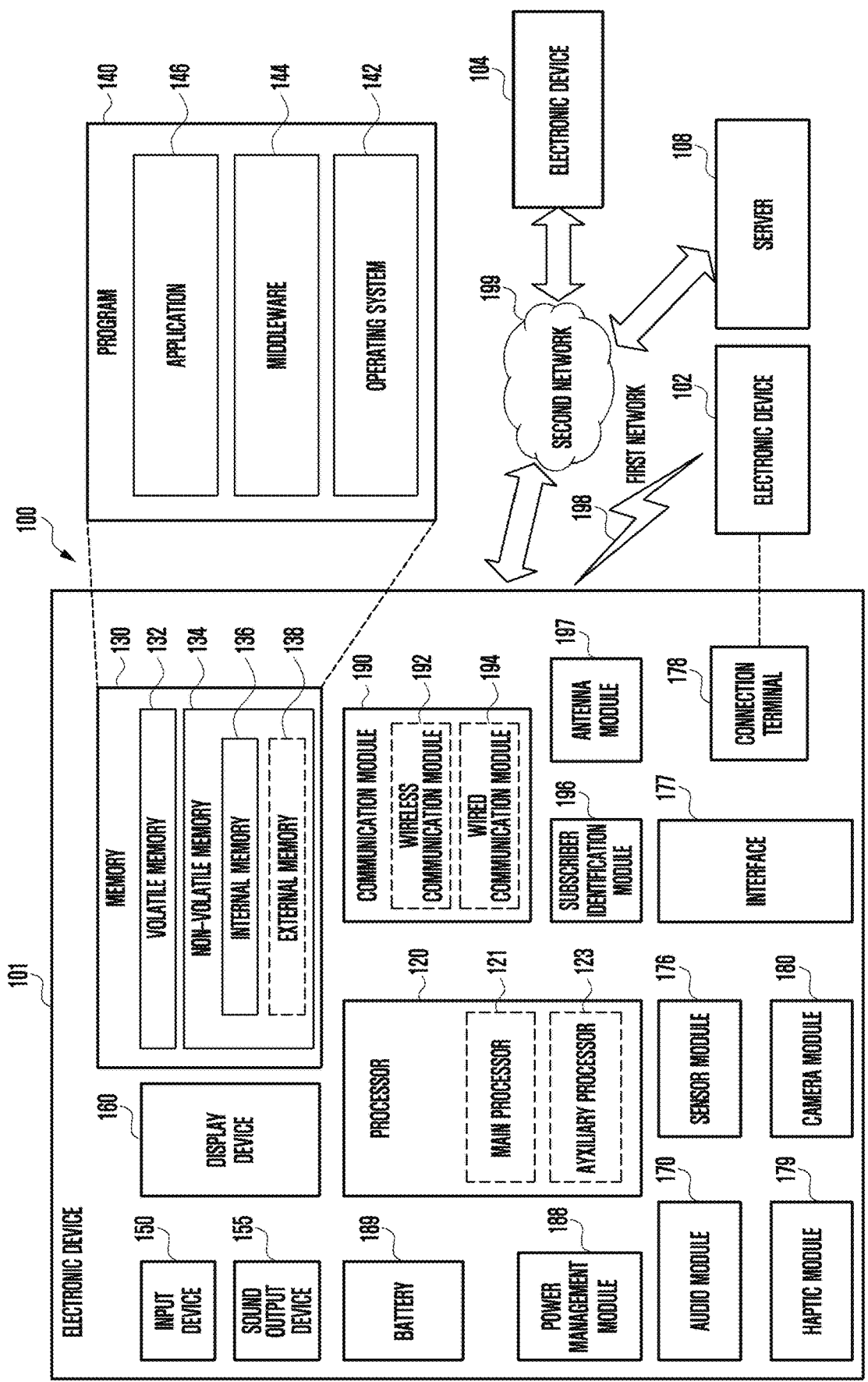
FIG. 1 illustrates a block diagram illustrating an electronic device in a network environment according to various embodiments of the disclosure.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 (e.g., DRAM, SRAM or SDRAM) may include the volatile memory 132 or the non-volatile memory 134.

The program 140 may be stored in the memory 130 as software, and may include, for example, an operating system (OS) 142, middleware 144, or an application 146 (e.g., application program).

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. The antenna module 197 may include an antenna including a radiating element composed of a conductive material or a conductive pattern formed in or on a substrate (e.g., a printed circuit board (PCB)). The antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
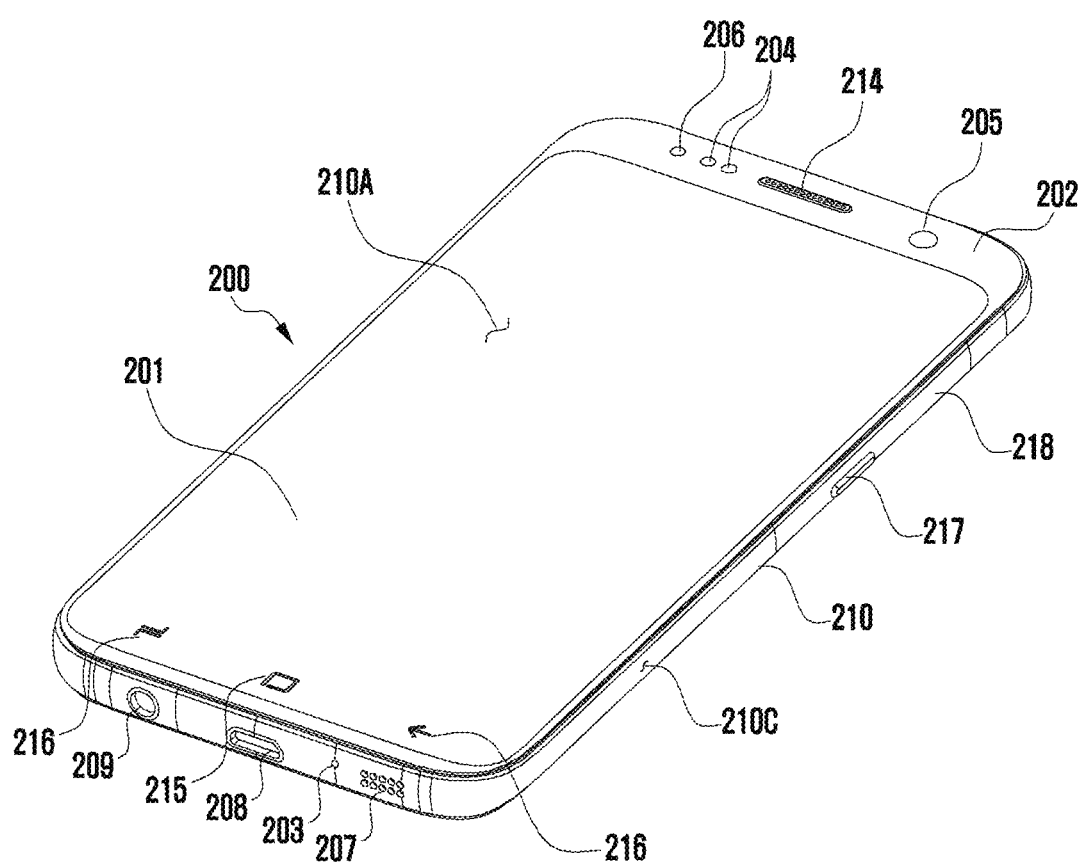
FIG. 2 illustrates a front perspective view illustrating a mobile electronic device according to various embodiments of the disclosure.
Figure 3:
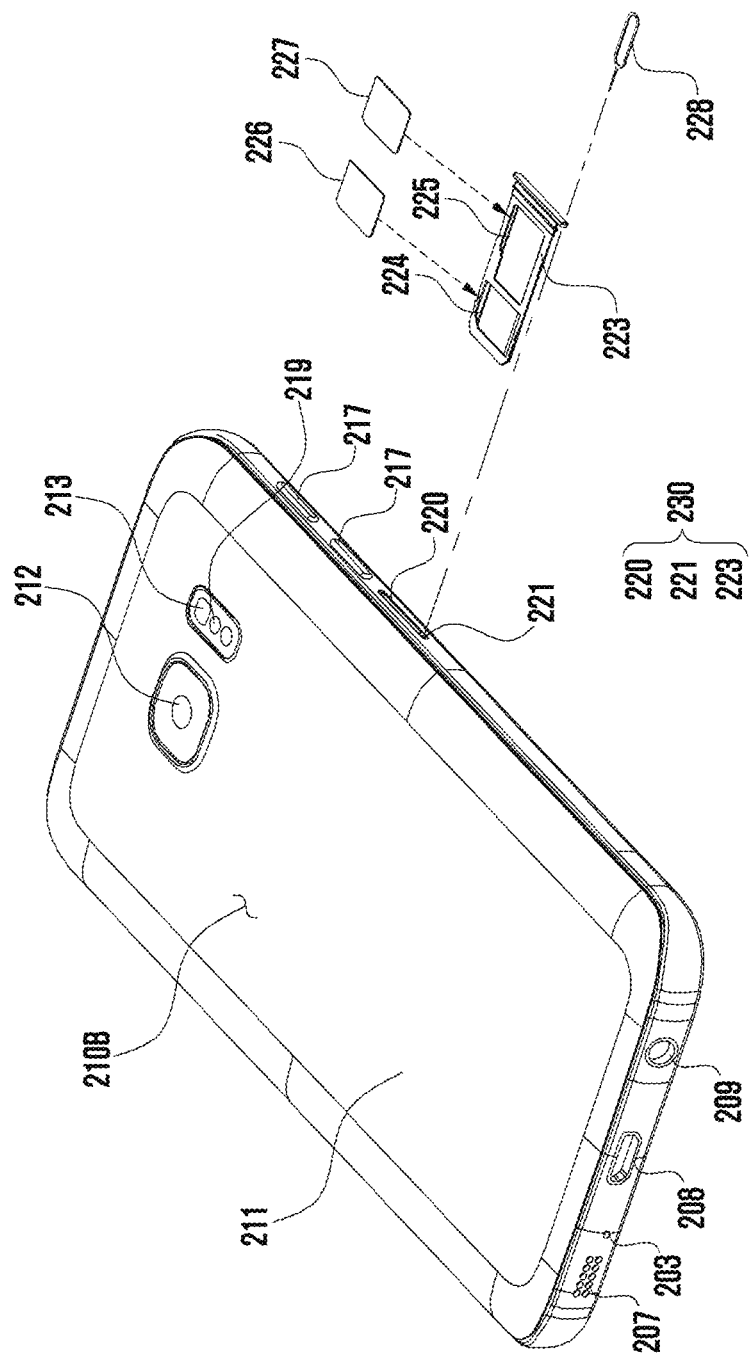
FIG. 3 illustrates a rear perspective view illustrating a mobile electronic device according to various embodiments of the disclosure.

FIG. 2 illustrates a front perspective view illustrating a mobile electronic device 200 according to various embodiments of the disclosure. FIG. 3 illustrates a rear perspective view illustrating a mobile electronic device 200 according to various embodiments of the disclosure.

Referring to FIGS. 2 and 3, the mobile electronic device 200 (e.g., the electronic device 101 of FIG. 1) according to various embodiments may include a housing 210 including a first surface (or front surface) 210A, a second surface (or rear surface) 210B, and a lateral surface 210C enclosing a space between the first surface 210A and the second surface 210B. In an embodiment (not illustrated), the housing may refer to a structure forming some of the first surface 210A, the second surface 210B, and the lateral surface 210C.

According to an embodiment, the first surface 210A may be formed by an at least partially substantially transparent front plate 202 (e.g., a polymer plate or a glass plate including various coating layers). The second surface 210B may be formed by a substantially opaque rear plate 211. The rear plate 211 may be formed by, for example, coated or colored glass, ceramic, polymer, metal (e.g., aluminum, stainless steel (STS), or magnesium), or a combination of at least two of the above materials. The lateral surface 210C may be coupled to the front plate 202 and the rear plate 211 and be formed by a lateral bezel structure (or "lateral member") 218 including a metal and/or a polymer. In some embodiments, the rear plate 211 and the lateral bezel structure 218 may be integrally formed and include the same material (e.g., metal material such as aluminum).

According to an embodiment, the mobile electronic device 200 may include at least one of a display 201 (e.g., the display device 160 in FIG. 1); audio modules 203, 207, and 214 (e.g., the audio module 170 in FIG. 1); sensor modules 204, and 219 (e.g., the sensor module 176 in FIG. 1); camera modules 205, 212, and 213 (e.g., the camera module 180 in FIG. 1); key input device 215, 216, and 217 (e.g., the key input device 150 in FIG. 1); indicator 206; and connector holes 208 and 209. In some embodiments, the mobile electronic device 200 may omit at least one (e.g., the key input device 215, 216, and 217 or the indicator 306) of the components, or may further include other components.

According to an embodiment, the display 201 may be exposed through a portion of the front plate 202. For example, the display 201 may be disposed adjacent to or combined with a touch sensing circuit, a pressure sensor capable of measuring the intensity (or pressure) of a touch, and/or a digitizer capable of detecting a magnetic field type stylus pen.

The audio modules 203, 207, and 214 may include a microphone hole 203 and speaker holes 207 and 214. The microphone hole 203 may dispose a microphone for obtaining an external sound therein; and, in some embodiments, a plurality of microphones (e.g., the microphone hole 203) may be disposed to detect a direction of a sound. The speaker holes 207 and 214 may include an external speaker hole 207 and a call receiver hole 214. In some embodiments, the speaker holes 207 and 214 and the microphone hole 203 may be implemented into one hole, or the speaker may be included without the speaker holes 207 and 214 (e.g., piezo speaker).

The sensor modules 204 and 219 may generate an electrical signal or a data value corresponding to an operating state inside the mobile electronic device 200 or an environment state outside the mobile electronic device 200. The sensor modules 204 and 219 may include, for example, a first sensor module 204 (e.g., proximity sensor) and/or a second sensor module (not illustrated) (e.g., fingerprint sensor), disposed at the first surface 210A of the housing 210, and/or a third sensor module 219 (e.g., a heart rate monitor (HRM) sensor), disposed at the second surface 210B of the housing 210. The fingerprint sensor may be disposed at the second surface 210B as well as the first surface 210A (e.g., the display 201) of the housing 210. The mobile electronic device 200 may further include a sensor module (not illustrated), for example, at least one of a gesture sensor, gyro sensor, air pressure sensor, magnetic sensor, acceleration sensor, grip sensor, color sensor, IR sensor, biometric sensor, temperature sensor, humidity sensor, and illumination sensor 204.

The camera modules 205, 212, and 213 may include a first camera device 205 disposed at the first surface 210A of the mobile electronic device 200, a second camera device 212 disposed at the second surface 210B thereof, and/or a flash 213. The camera modules 205 and 212 may include one or a plurality of lenses, an image sensor, and/or an image signal processor. The flash 213 may include, for example, a light emitting diode or a xenon lamp. In some embodiments, two or more lenses (infrared camera, wide angle and telephoto lens) and image sensors may be disposed at one surface of the mobile electronic device 200.

According to an embodiment, the key input devices 215, 216, and 217 may include a home key button 215 disposed on the first surface 210A of the housing 210, a touch pad 216 disposed near the home key button 215, and/or a side key button 217 disposed on the lateral surface 210C of the housing 210. In another embodiment, the electronic device 200 may not include some or all of the aforementioned key input devices 215, 216, and 217, and the key input device(s)

that is/are not included may be implemented in any other form such as a soft key on the display 201.

The indicator 206 may be disposed at, for example, the first surface 210A of the housing 210. The indicator 206 may include, for example, a light emitting diode (LED), an IR LED, and a xenon lamp.

The connector ports 208 and 209 may include a first connector port 208 that may receive a connector (e.g., a USB connector) for transmitting and receiving power and/or data to and from an external electronic device and/or a second connector hole (e.g., earphone jack) 209 that can receive a connector for transmitting and receiving audio signals to and from an external electronic device.

According to an embodiment, the electronic device 200 may include a SIM tray structure 230. For example, the SIM tray structure 230 may include a SIM tray 223 allowing storage media 226 and 227 to be loaded, an opening 220 allowing the SIM tray 223 to be inserted, a through-hole 221 adjacent to the opening 220, and a space formed between the front plate 202 and the rear plate 211 to accommodate the storage media 226 and 227. For example, the opening 220 may be disposed in the lateral member 218. For example, the SIM tray 223 may be detachably coupled to the lateral member 218. The storage media 226 and 227 may include, for example, at least one SIM card and/or a memory card such as a secure digital (SD) card or a micro SD card. According to an embodiment, the storage media 226 and 227 may be SIM cards 226 and 227, which may be essential components for wireless communication. Each SIM card may store subscriber identification information, authentication information for authentication between a sub scriber and a network, and related data. According to an embodiment, the SIM cards 226 and 227 may be loaded in the SIM tray 223, and then the SIM tray 223 where the SIM cards 226 and 227 are loaded may be inserted into the space between the front and rear plates 202 and 211 through the opening 220. For example, the space may contain a socket configured to accommodate the SIM tray 223. According to an embodiment, the SIM tray 223 may have at least one loading structure allowing the least one SIM card to be loaded. According to an embodiment, the at least one loading structure may include a first slot 224 having a suitable form for accommodating one SIM card, and a second slot 225 having a suitable form for accommodating a stack of another SIM card and a memory card.

According to an embodiment, the through-hole 221 may be formed at a place adjacent to the opening 220 in the lateral member 218 in order to allow the SIM tray 223 to be detached from the electronic device 200. Specifically, when an external tool 228 (e.g., an ejection pin) is inserted into the through-hole 221, the SIM tray 223 may be ejected from the electronic device 200. For example, the space between the front and rear plates 202 and 211 may further contain, at a place adjacent to the socket for accommodating the SIM tray 223, a SIM tray ejecting structure configured to eject the SIM tray 223 in response to a press of the external tool 228 inserted into the through-hole 221.

According to an embodiment, the electronic device 200 may use two methods (i.e., a SIM card detection method and a SIM tray detection method) to detect whether the SIM tray 223 is inserted through the opening 220. The first method may be a SIM card detection method that the electronic device 200 identifies whether at least one SIM card is loaded in the SIM tray 223. For example, the electronic device 200 may check in real time an insertion or removal of the SIM card by using a general-purpose input/output (GPIO) pin. According to an embodiment, the electronic device 200 may use a plurality of GPIO pins to detect whether at least one SIM card is inserted or removed. The electronic device 200 may add one terminal connected to a GPIO pin to correspond to a ground (GND) terminal of the SIM card, and maintain the added terminal in a default high level state. According to an embodiment, when the SIM card is inserted into the electronic device 200, the added terminal may be in contact with the GND terminal of the SIM card and thereby fall to a low level state. The electronic device 200 may detect the insertion of the SIM card, based on the state of the added terminal. When the inserted SIM card is ejected from the electronic device 200, the added terminal may be changed to the default high level state. The second method may be a SIM tray detection method that the electronic device 200 identifies whether the SIM tray 223 is completely inserted through the opening 220. For example, the SIM tray 223 may have a fixing member or fixing clip for being fixed to the electronic device 200. In addition, the electronic device 200 may have a SIM tray coupling structure corresponding to the fixing member or fixing clip of the SIM tray 223, so that when the SIM tray 223 is inserted, the electronic device 200 may check, using the SIM tray coupling structure, whether the SIM tray 223 is inserted. The SIM tray detection method needs an additional fixing structure for each of the SIM tray 223 and the electronic device 200, thus causing higher manufacturing cost than that of the SIM card detection method.

Figure 4:
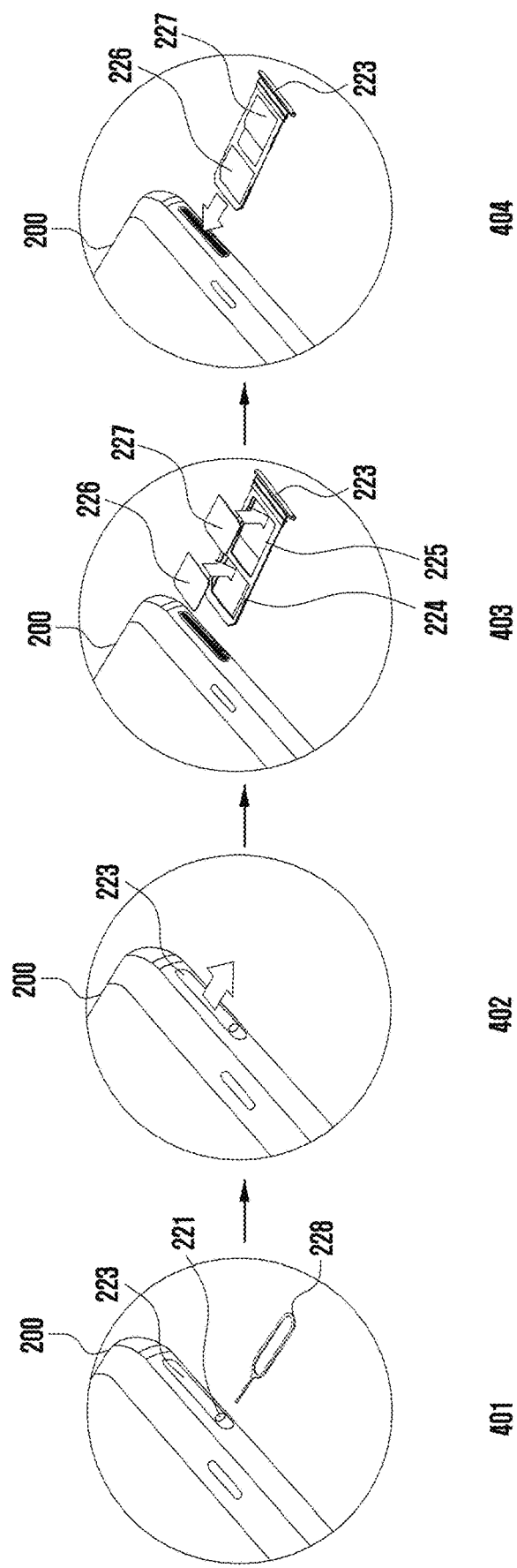
FIG. 4 illustrates a diagram illustrating a process of inserting a SIM tray with SIM cards into an electronic device according to various embodiments of the disclosure.

FIG. 4 illustrates a diagram illustrating a process of inserting a SIM tray with SIM cards into an electronic device according to various embodiments of the disclosure.

Specifically, FIG. 4 shows a process of separating the SIM tray 223 from the electronic device 200, loading at least one SIM card 226, 227 in the separated SIM tray 223, and then inserting the SIM tray 223 into the electronic device 200. Referring to FIG. 4, the above-described process is illustrated as four steps.

A first step 401 shows the electronic device 200 having an opening 200 into which the SIM tray 223 is inserted, and a through-hole 221 formed adjacent to the opening 200. According to an embodiment, when an external object 228 (e.g., an ejection pin) is inserted into the through-hole 221, the SIM tray 223 may be ejected from the electronic device 200.

A second step 402 shows a situation in which the SIM tray 223 is ejected from the electronic device 200 as the external object 228 is inserted into the through-hole 221.

A third step 403 shows a situation in which at least one SIM card (e.g., a first SIM card 226 and/or a second SIM card 227) is loaded in at least one loading structure (e.g., a first slot 224 and/or a second slot 225) of the SIM tray 223.

A fourth step 404 shows a situation in which the SIM tray 223 with the loaded at least one SIM card (e.g., the first SIM card 226 and/or the second SIM card 227) is inserted into the electronic device 200.

According to an embodiment, when the SIM tray 223 with the at least one SIM card (e.g., the first SIM card 226 and/or the second SIM card 227) is inserted, the electronic device 200 may perform a reset operation for the at least one SIM card. Thus, the electronic device 200 may perform a wireless communication service corresponding to the at least one SIM card.

Figure 5:
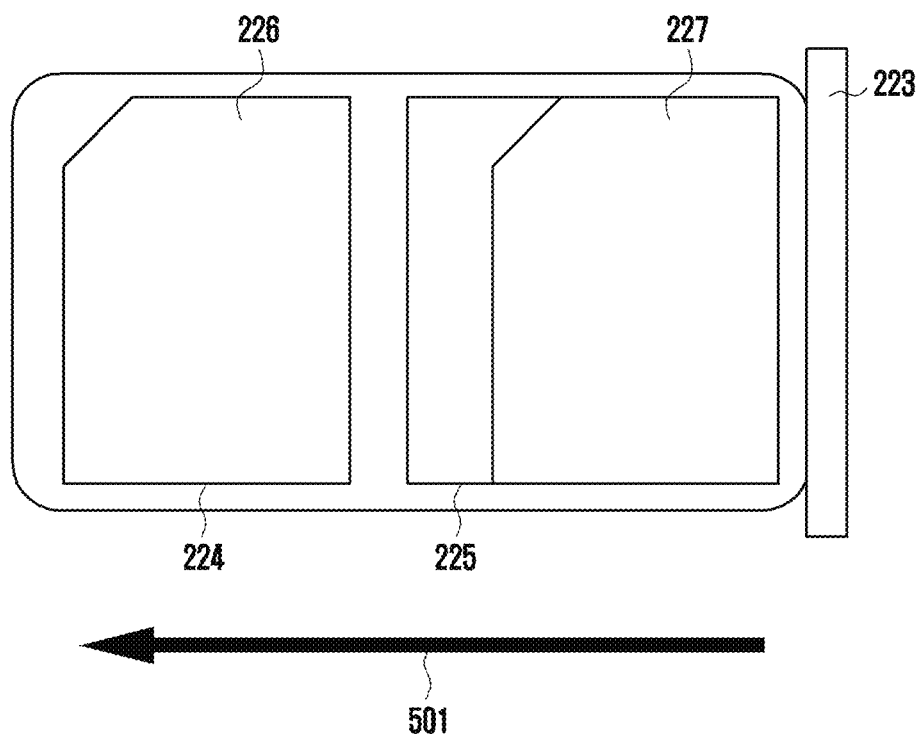
FIG. 5 illustrates a diagram illustrating a SIM tray in which at least one SIM card is loaded according to various embodiments of the disclosure.

FIG. 5 illustrates a diagram illustrating a SIM tray 500 (or 223) in which at least one SIM card is loaded according to various embodiments of the disclosure.

Specifically, FIG. 5 shows the SIM tray 223 that allows two SIM cards (i.e., the first SIM card 226 and the second SIM card 227) to be loaded. The SIM tray 223 may include a dual SIM tray in which two SIM cards can be loaded together. The SIM tray 223 may be a serial type tray in which two SIM cards are loaded in a row. The SIM tray 223 may be inserted into the electronic device (e.g., the electronic device 200 in FIG. 2) along a first direction 501. In the SIM tray 223, the first SIM card 226 may be loaded in the first slot 224, and the second SIM card 227 may be loaded in the second slot 225. Thus, the first SIM card 226 may be inserted into the electronic device 200 first, and then the second SIM card 227 may be inserted into the electronic device 200. When both of the two SIM cards are inserted into the electronic device 200, this means that the insertion of the SIM tray 223 is completed.

According to an embodiment, in order to determine whether the insertion of the SIM tray 223 is completed, the electronic device 200 may use at least one of a SIM card detection method and a SIM tray detection method. For example, the SIM card detection method is to identify at least one SIM card loaded in the SIM tray 223 and thereby determine whether the insertion of the SIM tray 223 is completed. The electronic device 200 may include a SIM (e.g., the SIM 196 in FIG. 1) corresponding to a region into which the SIM tray 223 is inserted. The SIM 196 may include at least one detector for detecting at least one SIM card loaded in the SIM tray 223. For example, when the insertion of the SIM tray 223 is completed, a first detector (e.g., the first detector 621 in FIG. 6) may be disposed to correspond to the second slot 225, and a second detector (e.g., the second detector 622 in FIG. 6) may be disposed to correspond to the first slot 224. When the insertion of the SIM tray 223 into the electronic device 200 is completed, the electronic device 200 may check, through the second detector, whether the first SIM card 226 is loaded in the first slot 224 of the SIM tray 223, and may also check, through the first detector, whether the second SIM card 227 is loaded in the second slot 225 of the SIM tray 223. According to an embodiment, when the first SIM card 226 loaded in the first slot 224 of the SIM tray 223 is detected through the first detector and then detected through the second detector within a predetermined time (e.g., about 500 ms), the electronic device 200 may determine that the insertion of the SIM tray 223 is completed. For example, the predetermined time may be a default time value set by a developer. According to another embodiment, when at least one SIM card is identified through the first detector for a given time even though no SIM card is detected through the second detector, the electronic device 200 may determine that the insertion of the SIM tray 223 is completed. In this case, the electronic device 200 may recognize that the SIM card is loaded only in the second slot 225 of the SIM tray 223. According to still another embodiment, if no SIM card is detected from both the first slot and the second slot for a given time, the electronic device 200 may display, on a display (e.g., the display device 160 in FIG. 1), a notification indicating that the SIM card is not inserted. According to an embodiment, based on the SIM card detection method, the electronic device 200 may detect whether at least one SIM card is loaded in the SIM tray 223. According to an embodiment, when the SIM card is detected from the first slot 224 of the SIM tray 223 through the second detector of the SIM, the electronic device 200 may determine that the insertion of the SIM tray 223 is completed.

Figure 6:
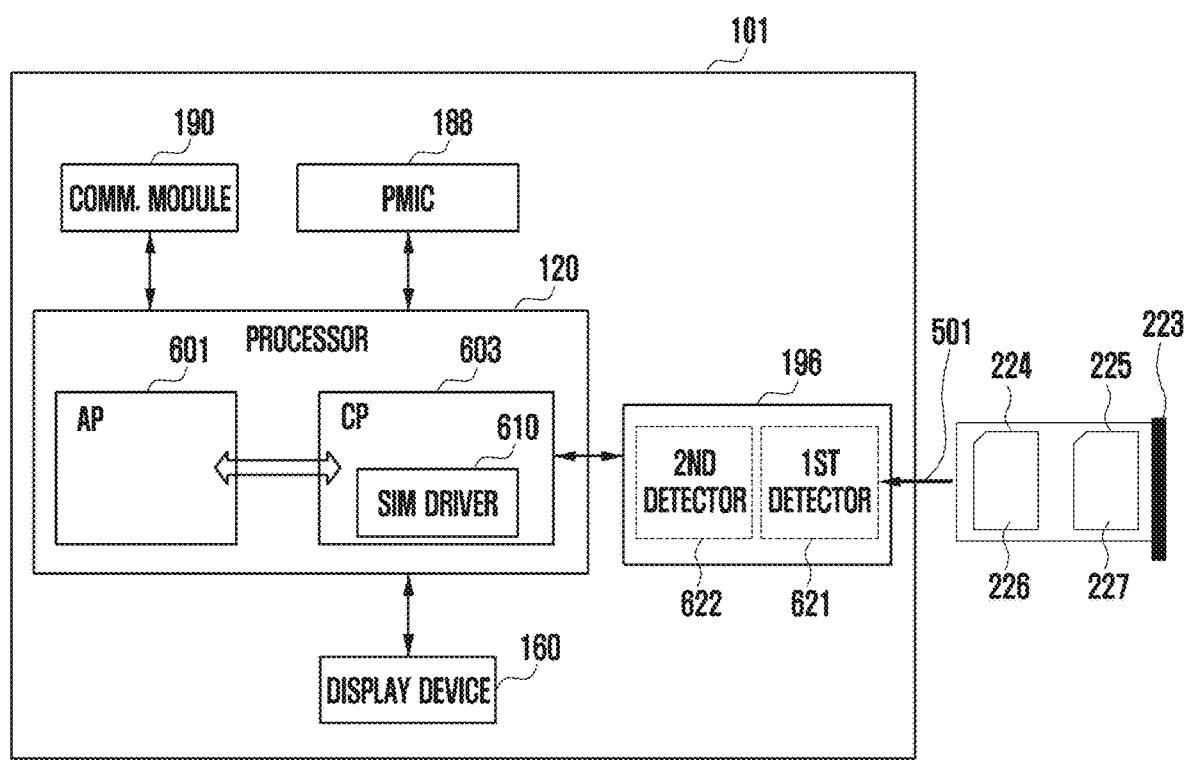
FIG. 6 illustrates a block diagram illustrating an electronic device according to various embodiments of the disclosure.

FIG. 6 illustrates a block diagram illustrating an electronic device according to various embodiments of the disclosure.

Referring to FIG. 6, the electronic device 101 may include a processor 120, a display device 160, a communication module 190, a power management module 188, and a subscriber identification module (SIM) 196, as also shown in FIG. 1. The SIM 196 may include a first detector 621 and a second detector 622, both of which are used when a SIM tray (e.g., the SIM tray 223 in FIG. 3) is inserted into the electronic device 101. The SIM tray 223 allows at least one SIM card and a storage medium to be loaded, and is capable of being inserted into or ejected from the electronic device 101.

According to an embodiment, the processor 120 may include an application processor (AP) 601 and a communication processor (CP) 603. The AP 601 may be included in the main processor 121 of FIG. 1, and the CP 603 may be included in the auxiliary processor 123 of FIG. 1. The AP 601 and CP 603 may be operated independently or together. The AP 601 may be a processor that processes application-related functions in the electronic device 101. The CP 603 may be a processor that processes communication-related functions in the electronic device 101. The CP 603 is also referred to as a modem chipset. The CP 603 may include a SIM driver 610. For example, the SIM driver 610 may be a software module that processes functions related to a SIM card. According to an embodiment, based on the first detector 621 and the second detector 622 included in the SIM 196, the SIM driver 610 may detect whether at least one SIM card is loaded in the SIM tray 223. According to an embodiment, the SIM driver 610 may detect whether the SIM card loaded in the SIM tray 223 is inserted or removed, and may perform or stop a reset operation for the SIM card.

According to an embodiment, the display device 160 may visually provide specific information to a user. The display device 160 may include, for example, a display, a hologram device, or a projector together with a related control circuit. According to an embodiment, the processor 120 may display notification information regarding the insertion or removal of the SIM card through the display device 160.

According to an embodiment, the power management module 188, which may be implemented as a power management integrated circuit (PMIC), may manage power supplied to the electronic device 101. According to an embodiment, using the power supplied from the power management module 188, the CP 603 may detect whether at least one SIM card loaded in the SIM tray 223 is inserted or removed.

According to an embodiment, the communication module 190 may establish a wireless communication channel between the electronic device 101 and an external electronic device and perform wireless communication through the established communication channel.

According to an embodiment, the SIM 196 may include the first detector 621 and the second detector 622 each of which is capable of identifying a SIM card. According to an embodiment, when the SIM tray 223 is inserted into the electronic device 101, at least one SIM card may be adjacent, at least in part, to or in contact with the first detector 621 or the second detector 622. For example, the first SIM card 226 loaded in the first slot 224 of the SIM tray 223 may be positioned at the second detector 622 through the first detector 621. In addition, the second SIM card 227 loaded in the second slot 225 of the SIM tray 223 may be positioned at the first detector 621. According to an embodiment, through the SIM 196, the processor 120 may identify the first SIM card 226 corresponding to the second detector 622 and also identify the second SIM card 226 corresponding to the first detector 621. Then the processor 120 may perform a reset operation for the identified first and second SIM cards 226 and 227.

According to an embodiment, the SIM tray 223 may be a component that allows at least one SIM card to be loaded and is inserted into the electronic device 101. The SIM tray 223 may be a serial type tray in which two SIM cards are loaded in a row. The SIM tray 223 may have a loading structure (e.g., the first slot 224 and the second slot 225) allowing the SIM card to be loaded. For example, the first SIM card 226 may be loaded in the first slot 224, and the second SIM card 227 may be loaded in the second slot 225.

According to an embodiment, the processor 120 may support a hot-swap function in detecting at least one SIM card through the SIM 196. The hot-swap function may be a function that enables the processor 120 to detect in real time the insertion of at least one SIM card and to perform a SIM reset operation for the inserted SIM card(s) without booting the electronic device 101. According to an embodiment, the electronic device 101 that supports the hot-swap function may continue the SIM reset operation for the SIM card(s) loaded in the SIM tray 223 if the SIM tray 223 is completely inserted into the electronic device 101 within a predetermined time (e.g., about 500 ms). That is, when the insertion of the SIM tray 223 is completed within the predetermined time (e.g., about 500 ms), the processor 120 may continuously perform the SIM reset operation without delay.

According to various embodiments, the electronic device 101 may include a SIM tray 223 allowing at least one SIM card (e.g., the first SIM card 226 and/or the second SIM card 227) to be loaded in a row, a SIM detector (e.g., the SIM 196) detecting the at least one SIM card, and a processor 120 operatively connected to the SIM detector. The processor 120 may be configured to detect, through the SIM detector, an insertion of the SIM tray 223 in which the at least one SIM card is loaded, to determine whether the insertion of the SIM tray 223 is completed within a predetermined time, and to perform a SIM reset operation corresponding to the at least one SIM card in response to the completed insertion of the SIM tray 223.

According to an embodiment, the SIM tray 223 may be formed in a serial structure that the at least one SIM card is loaded in a row and inserted into the electronic device one by one, and the SIM tray 223 may have at least one slot (e.g., the first slot 224 and/or the second slot 225) in which the at least one SIM card is loaded.

According to an embodiment, the SIM tray 223 may have a first slot 224 inserted first into the electronic device 101, and a second slot 225 inserted into the electronic device 101 after the first slot 224 is inserted.

According to an embodiment, the at least one SIM card may include a first SIM card 226 loaded in the first slot 224 of the SIM tray 223, and a second SIM card 227 loaded in the second slot 225 of the SIM tray 223.

According to an embodiment, the SIM detector 196 may include a first detector 621 and a second detector 622, and when the first SIM card 226 is detected through the first detector 621 and then detected through the second detector 622 within the predetermined time, the processor 120 may determine that the insertion of the SIM tray 223 is completed.

According to an embodiment, the processor 120 may have one general-purpose input/output (GPIO) pin electrically connected to each of the first and second detectors 621 and 622, and may detect an insertion or removal of each of the first and second SIM cards 226 and 227 by using the one GPIO pin.

According to an embodiment, the processor 120 may have a first GPIO pin electrically connected to the first detector and a second GPIO pin electrically connected to the second detector, and may detect an insertion or removal of the first and second SIM cards 226 and 227 by individually and respectively using the first and second GPIO pins.

According to an embodiment, the processor 120 may perform a SIM reset operation corresponding to the first SIM card 226 in response to detecting the first SIM card 226 through the first detector 621 while the SIM tray 223 is being inserted.

According to an embodiment, the processor 120 may stop the SIM reset operation when the first SIM card 226 is detected through the second detector 622 while the SIM reset operation is being performed through the first detector 621, and may delete reset information according to the SIM reset operation.

According to an embodiment, the processor 120 may perform a SIM reset operation corresponding to the second SIM card 227 in response to detecting the second SIM card 227 through the first detector 621 after deleting the reset information.

Figure 7A:
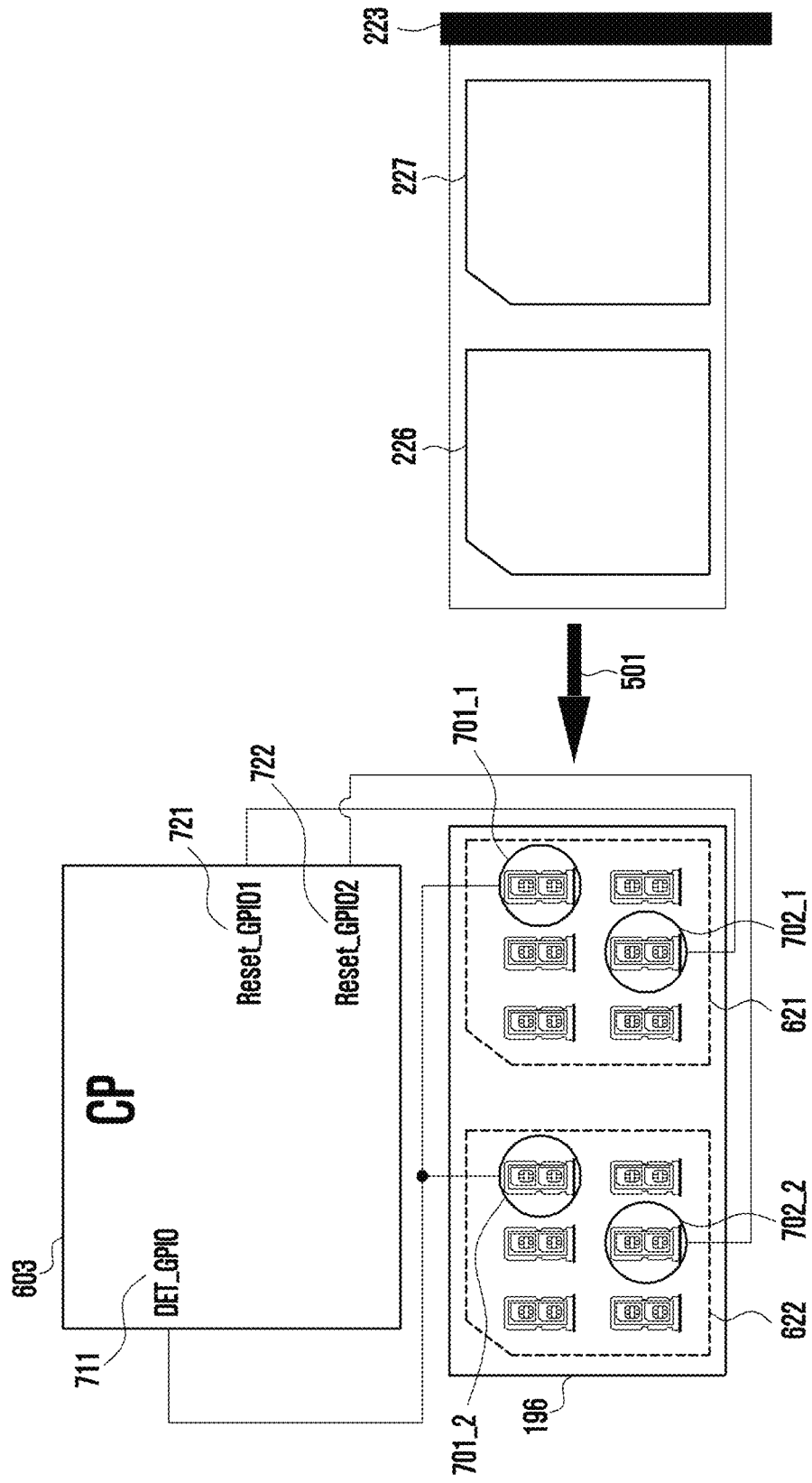
FIGS. 7A and 7B are diagrams illustrating a detector for detecting at least one SIM card in an electronic device according to various embodiments of the disclosure.
Figure 7B:
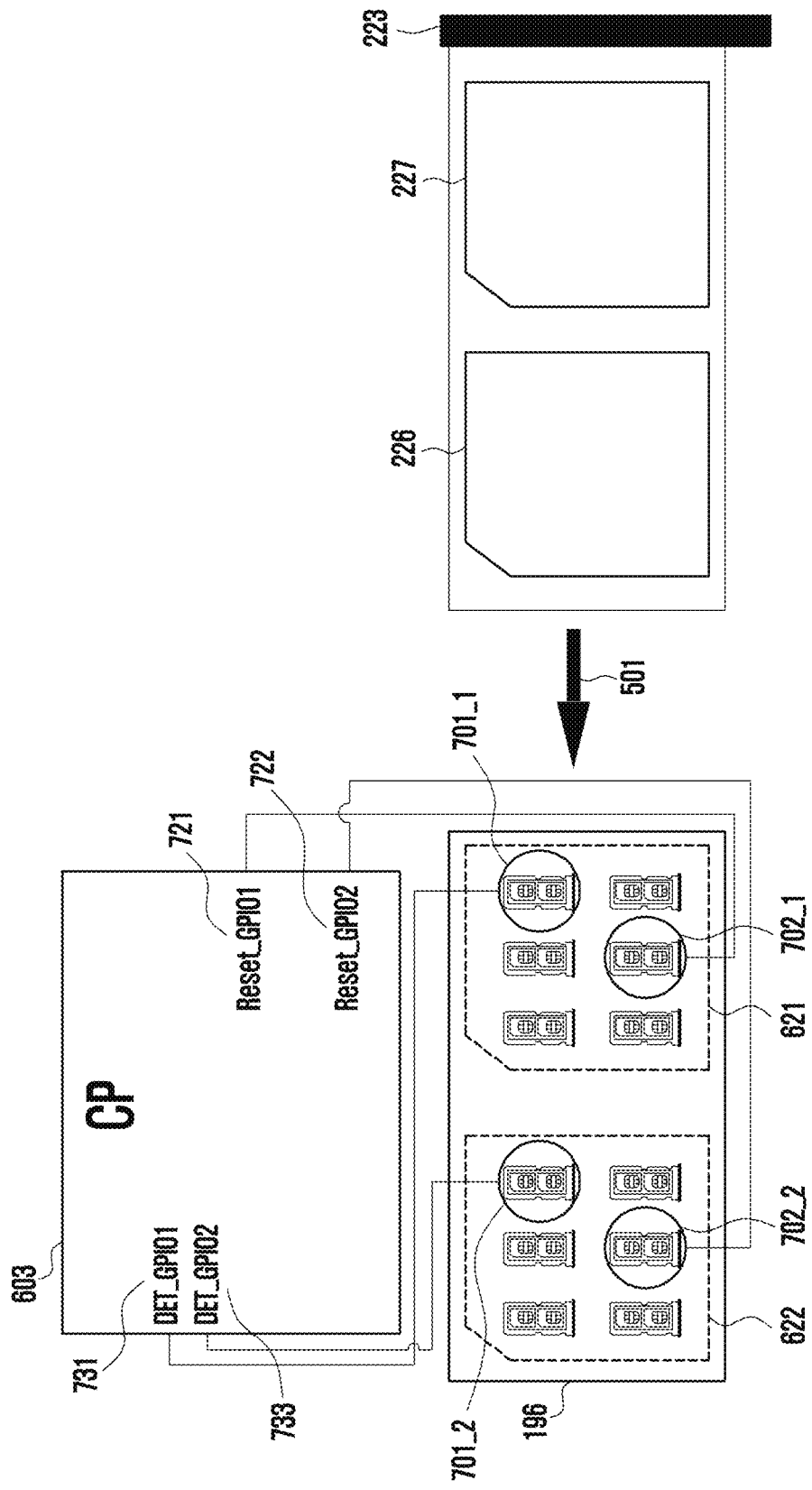

FIGS. 7A and 7B are diagrams illustrating a detector for detecting at least one SIM card in an electronic device according to various embodiments of the disclosure.

FIG. 7A illustrates the first and second detectors 621 and 622 connected to one GPIO pin 711 when the SIM tray 223 with at least one SIM card is inserted into the electronic device 101. FIG. 7B illustrates the first and second detectors 621 and 622 connected to two GPIO pins 731 and 733 when the SIM tray 223 with at least one SIM card is inserted into the electronic device 101.

Referring to FIG. 7A, the SIM 196 of the electronic device (e.g., the electronic device 101 in FIG. 1) may include the first detector 621 and the second detector 622. When the SIM tray 223 is inserted into the electronic device 101 in a first direction 501, the SIM 196 may detect the first and second SIM cards 226 and 227 loaded in the SIM tray 223. According to an embodiment, the SIM tray 223 may be a serial type tray in which the first SIM card 226 and the second SIM card 227 are loaded in a row.

According to an embodiment, the first detector 621 may have a first detection pin 701-1 and a first reset pin 702-1. For example, the first detector 621 may detect a SIM card inserted into the electronic device 101, based on the first detection pin 701-1, and may also perform a SIM reset operation for the detected SIM card, based on the first reset pin 702-1. According to an embodiment, when the insertion of the SIM tray 223 into the electronic device 101 is completed, the second SIM card 227 may be disposed to correspond to the first detector 621. The first detector 621 may detect the second SIM card 227 and perform a SIM reset operation for the second SIM card 227.

According to an embodiment, the second detector 622 may have a second detection pin 701-2 and a second reset pin 702-2. For example, the second detector 621 may detect a SIM card inserted into the electronic device 101, based on the second detection pin 701-2, and may also perform a SIM reset operation for the detected SIM card, based on the second reset pin 702-2. According to an embodiment, when the insertion of the SIM tray 223 into the electronic device 101 is completed, the first SIM card 226 may be disposed to correspond to the second detector 622. The second detector 622 may detect the first SIM card 226 and perform a SIM reset operation for the first SIM card 226.

According to an embodiment, the first detection pin 701-1 and the second detection pin 701-2 may be electrically connected to one GPIO pin 711 (e.g., DET_GPIO). According to an embodiment, the electronic device 101 may detect at least one SIM card through the one GPIO pin 711 and perform a SIM reset operation for the detected at least one SIM card. According to an embodiment, the first reset pin 702-1 may be electrically connected to a RESET_GPIO1 pin 721, and the second reset pin 702-2 may be electrically connected to a RESET_GPIO2 pin 722. According to an embodiment, using the one GPIO pin 711 (DET_GPIO), the electronic device 101 may detect at least one SIM card loaded in the SIM tray.

FIG. 7B shows the first and second detectors 621 and 622 connected to two GPIO pins (e.g., a DET_GPIO1 pin 731 and a DET GPIO2 pin 733) when the SIM tray 223 with at least one SIM card is inserted into the electronic device 101.

According to an embodiment, the first detection pin 701-1 may be electrically connected to the DET_GPIO1 pin 731, and the second detection pin 701-2 may be electrically connected to the DET GPIO2 pin 733. According to an embodiment, the electronic device 101 may individually detect a SIM card through the two GPIO pins 731 and 733 and perform a SIM reset operation for the detected SIM card.

Figure 8:
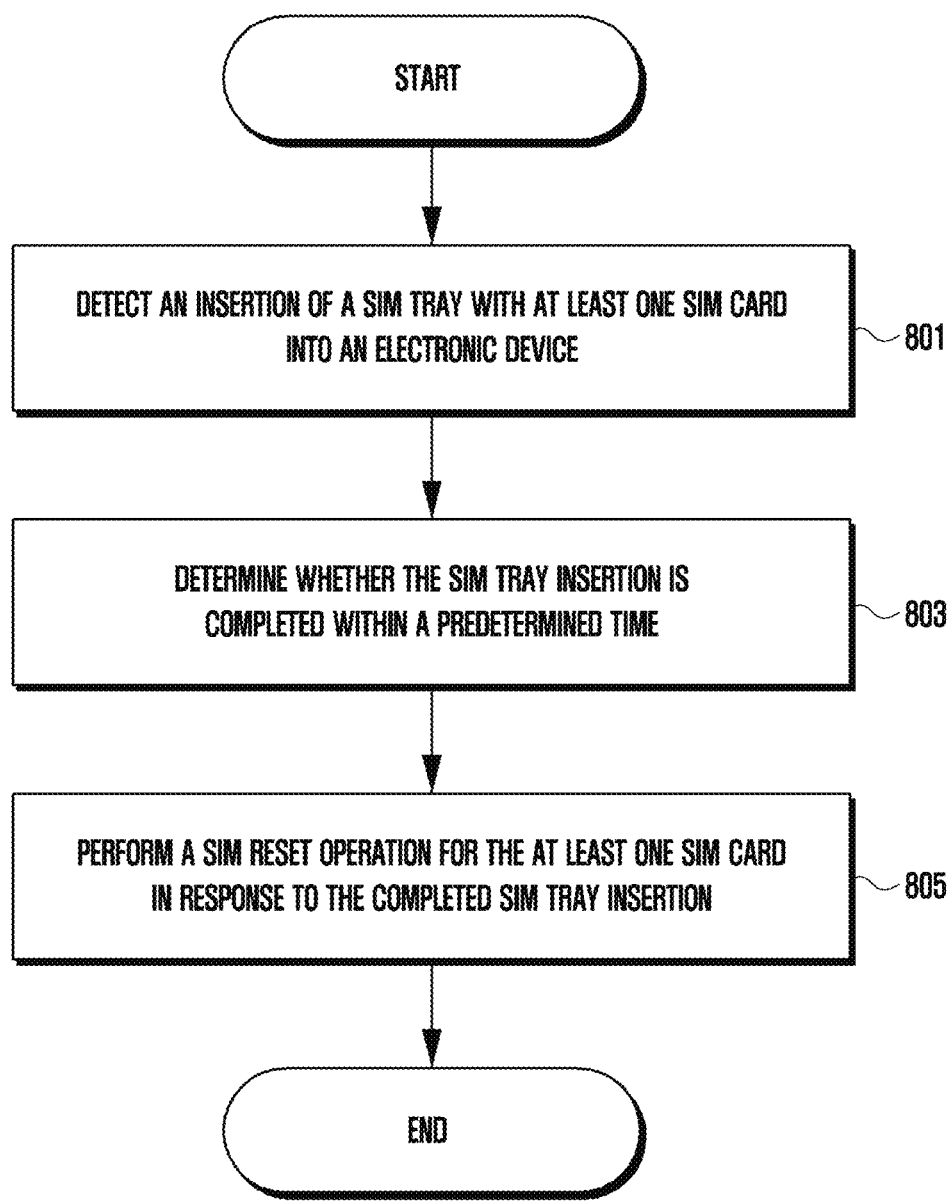
FIG. 8 illustrates a flow diagram illustrating a method of resetting a SIM card loaded in a SIM tray after detecting a completed insertion of the SIM tray in an electronic device according to various embodiments of the disclosure.

FIG. 8 illustrates a flow diagram illustrating a method of resetting a SIM card loaded in a SIM tray after detecting a completed insertion of the SIM tray in an electronic device according to various embodiments of the disclosure.

Referring to FIG. 8, at operation 801, a SIM tray (e.g., the SIM tray 223 in FIG. 3) in which at least one SIM card is loaded may be inserted into an electronic device (e.g., the electronic device 101 in FIG. 1). According to an embodiment, through a SIM detector, the electronic device 101 may detect the insertion of the SIM tray 223 with the at least one SIM card. The SIM tray 223 may be a tray having a serial structure in which a plurality of SIM cards are loaded in a row. For example, the electronic device 101 may perform a SIM reset operation for at least one SIM card, based on a hot-swap function, after booting is completed. The hot-swap function may be a function of continuously performing the SIM reset operation for the SIM card loaded in the SIM tray 223 when the insertion of the SIM tray 223 is completed within a predetermined time (e.g., about 500 ms). For example, when the SIM card is inserted, the electronic device 101 that supports the hot-swap function may perform a SIM reset operation for the inserted SIM card without a booting process.

At operation 803, a processor (e.g., the processor 120 in FIG. 1) of the electronic device 101 may determine whether the insertion of the SIM tray 223 is completed within a predetermined time. According to an embodiment, based on a SIM (e.g., the SIM 196 in FIG. 1) for detecting a SIM card loaded in the SIM tray 223, the processor 120 may check whether the insertion of the SIM tray 223 is completed. For example, when a first SIM card (e.g., the first SIM card 226 in FIG. 6) is detected through a second detector (e.g., the second detector 622 in FIG. 6) of the SIM 196, the processor 120 may determine that the insertion of the SIM tray 223 is completed.

At operation 805, the processor 120 may perform a SIM reset operation for the at least one SIM card when the insertion of the SIM tray 223 is completed. According to an embodiment, if a plurality of SIM cards (e.g., a first SIM card and a second SIM card) are loaded in the SIM tray 223, the SIM reset operation may be performed for each of the plurality of SIM cards.

According to an embodiment, the electronic device 101 may determine whether the insertion of the SIM tray 223 is completed within the predetermined time, and may perform a SIM reset operation for at least one SIM card loaded in the SIM tray, based on a result of determination. According to an embodiment, the electronic device 101 may perform a SIM reset operation for a SIM card without a booting process for the electronic device 101 by using the hot-swap function.

Figure 9:
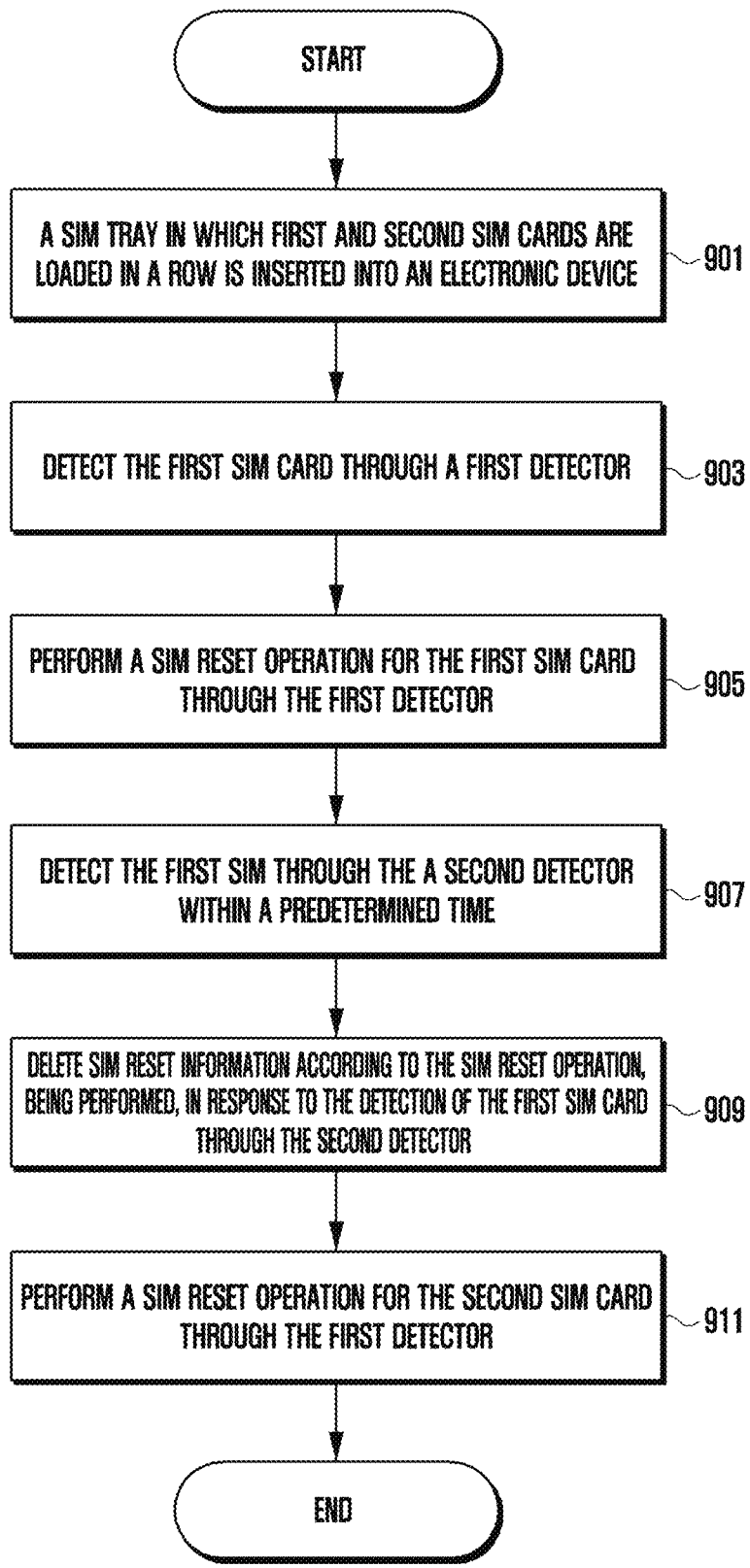
FIG. 9 illustrates a flow diagram illustrating a method of resetting a SIM card loaded in a SIM tray after detecting a completed insertion of the SIM tray through a detector in an electronic device according to various embodiments of the disclosure.

FIG. 9 illustrates a flow diagram illustrating a method of resetting a SIM card loaded in a SIM tray after detecting a completed insertion of the SIM tray through a detector in an electronic device according to various embodiments of the disclosure.

Referring to FIG. 9, at operation 901, a SIM tray (e.g., the SIM tray 223 in FIG. 3) in which a first SIM card (e.g., the first SIM card 226 in FIG. 3) and a second SIM card (e.g., the second SIM card 227 in FIG. 3) are loaded in a row may be inserted into an electronic device (e.g., the electronic device 101 in FIG. 1). For example, the SIM tray 223 may be a serial type tray, and the first SIM card 226 and the second SIM card 227 may be sequentially loaded. When the SIM tray 223 is inserted into the electronic device 101, the first SIM card 226 may be inserted first, and then the second SIM card 227 may be inserted.

At operation 903, the processor 120 may detect the first SIM card 226 through a first detector (e.g., the first detector 621 in FIG. 6) of a SIM (e.g., the SIM 196 in FIG. 1). For example, the processor 120 may detect the insertion of the first SIM card 226 by using a first detection pin (e.g., the first detection pin 701-1 in FIG. 7A) included in the first detector 621.

At operation 905, the processor 120 may perform a SIM reset operation for the first SIM card 226 through the first detector 621. For example, the processor 120 may perform a SIM reset operation for the first SIM card 226 by using a first reset pin (e.g., the first reset pin 702-1 in FIG. 7A) included in the first detector 621. The SIM tray 223 at the operations 901 to 905 may be being inserted into the electronic device 101. For example, when both the first SIM card 226 and the second SIM card 227 loaded in the SIM tray 223 are inserted into and then fixed to the electronic device 101, this may mean that the insertion of the SIM tray 223 is completed. The operations 901 to 905 may correspond to a state in which only the first SIM card 226 loaded in the SIM tray 223 is inserted into the electronic device 101.

At operation 907, the processor 120 may detect the insertion of the first SIM card 226 through the second detector 622 of the SIM 196 within a predetermined time (e.g., about 500 ms). For example, the processor 120 may detect the insertion of the first SIM card 226 by using a second detection pin (e.g., the second detection pin 701-2 in FIG. 7A) included in the second detector 622. According to an embodiment, a state where the insertion of the first SIM card 226 is detected through the second detector 622 may mean that the SIM tray 223 is completely inserted into the electronic device 101.

When the first SIM card 226 is detected through the second detector 622, the processor 120 may delete, at operation 909, SIM reset information according to the SIM reset operation being performed at the operation 905. For example, while the SIM reset operation for the first SIM card 226 is performed at the operation 905, the SIM tray 223 may be continuously inserted into the electronic device 101, and thereby the second SIM card 227 may be detected through the first detector 621. In this case, as the SIM reset operation for the first SIM card 226 is changed to the SIM reset operation for the second SIM card 227, an error related to the SIM reset operation may occur. According to an embodiment, when the first SIM card 226 is detected through the second detector 622 (that is, when the insertion of the SIM tray 223 is completed), the processor 120 may delete reset information related to the SIM reset operation being performed through the first detector 621. This deletion can prevent a wrong operation related to the SIM reset operation.

At operation 911, the processor 120 may perform a SIM reset operation for the second SIM card 227 through the first detector 621. Although not shown, when the first SIM card 226 is detected through the second detector 622 at the operation 907, the processor 120 may perform the SIM reset operation for the first SIM card 226 through the second detector 622.

According to an embodiment, when the SIM tray 223 is completely inserted into the electronic device 101, the electronic device 101 may perform a SIM reset operation for the second SIM card 227 corresponding to the first detector 621 and also perform a SIM reset operation for the first SIM card 226 corresponding to the second detector 622. According to an embodiment, the electronic device 101 may perform a SIM reset operation for at least one SIM card by using a hot-swap function without a booting process of the electronic device 101. According to an embodiment, when the SIM tray 223 is completely inserted into the electronic device 101, the electronic device 101 may delete SIM reset information related to the SIM reset operation being performed through the first detector 621, thereby preventing malfunction due to the SIM reset operation.

Figure 10:
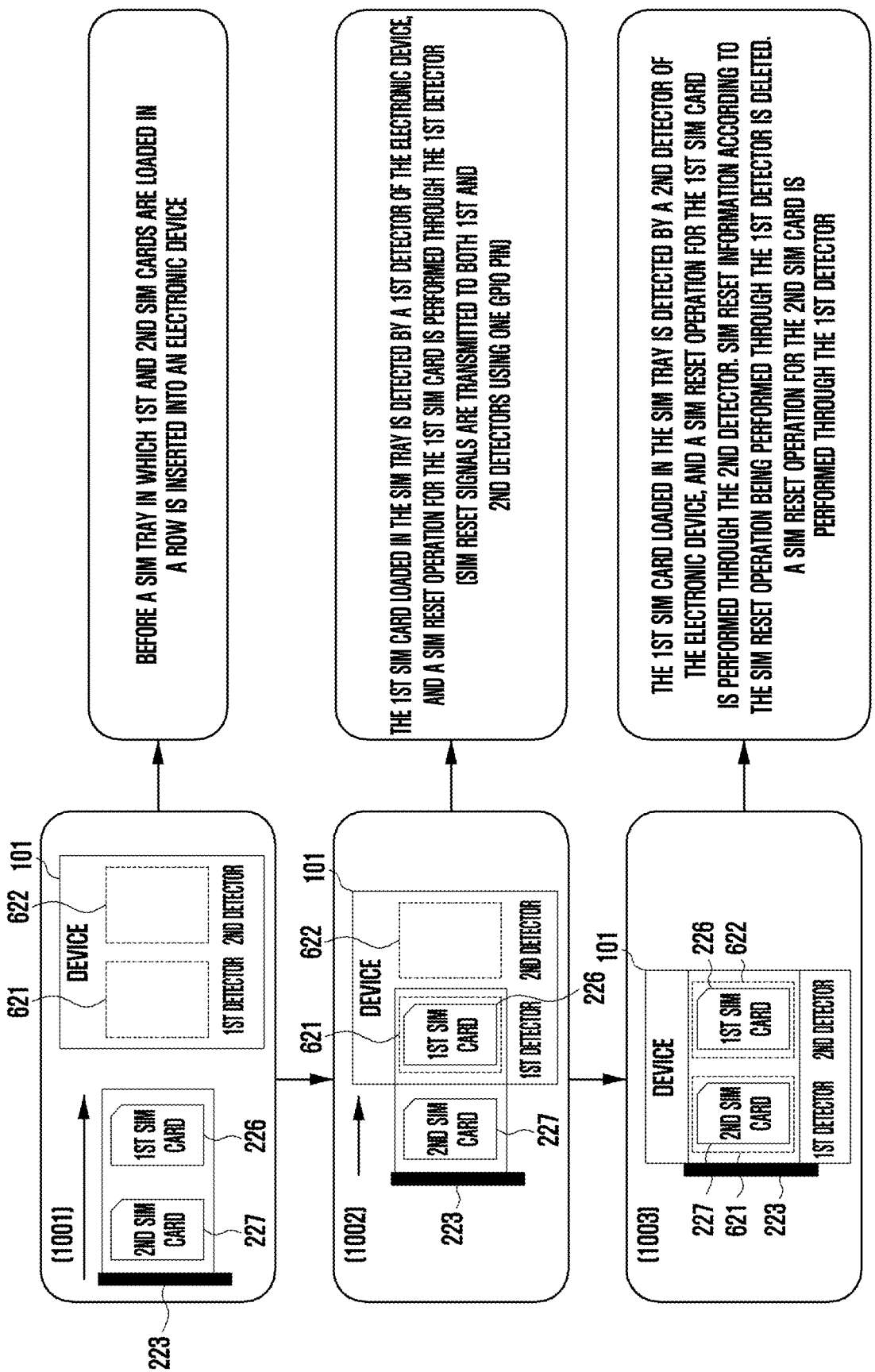
FIG. 10 illustrates a diagram illustrating a first embodiment of performing a SIM reset operation for a SIM card loaded in a SIM tray by using one GPIO pin in an electronic device according to various embodiments of the disclosure.

FIG. 10 illustrates a diagram illustrating a first embodiment of performing a SIM reset operation for a SIM card loaded in a SIM tray by using one GPIO pin in an electronic device according to various embodiments of the disclosure.

FIG. 10 shows a process of inserting the SIM tray 223 of a serial structure into the electronic device 101 and performing a SIM reset operation for the first and second SIM cards 226 and 227 loaded in the SIM tray 223 through the first and second detectors 621 and 622 of the electronic device 101. Specifically, FIG. 10 shows the above-described process as three steps.

A first step 1001 shows a situation before the serial-structured SIM tray 223 in which the first SIM card 226 and the second SIM card 227 are loaded in a row is inserted into the electronic device 101. Through the first and second detectors 621 and 622 of the SIM (e.g., the SIM 196 in FIG. 1), the electronic device 101 may detect whether the SIM tray 223 is inserted. According to an embodiment, the SIM tray 223 is a tray having a serial structure that the first SIM card 226 is first inserted into the electronic device 101 and then the second SIM card 227 is inserted into the electronic device 101.

A second step 1002 shows a situation in which the first SIM card 226 loaded in the SIM tray 223 is inserted into the electronic device 101 and the second SIM card 227 has not yet been inserted. According to an embodiment, the processor 120 may detect the insertion of the first SIM card 226 through the first detector 621, and then perform a SIM reset operation for the first SIM card 226 through the first detector 621. According to an embodiment, the electronic device 101 may transmit SIM reset signals to both the first and second detectors 621 and 622 by using one GPIO pin. For example, the first detector 621 may perform a SIM reset operation for the inserted first SIM card 226. The second detector 622 may periodically transmit a SIM reset signal at regular time intervals because there is no detected SIM card. According to an embodiment, the electronic device 101 may perform a SIM reset operation through the first detector 621 while the SIM tray 223 is being inserted.

A third step 1003 shows a situation in which the SIM tray 223 is completely inserted into the electronic device 101. According to an embodiment, the processor 120 may detect the insertion of the second SIM card 227 through the first detector 621, and also detect the insertion of the first SIM card 226 through the second detector 622. According to an embodiment, the processor 120 may stop the SIM reset operation for the first SIM card 226, being performed through the first detector 621, and delete information related to the SIM reset operation. Thereafter, the processor 120 may perform a SIM reset operation for the second SIM card 227 through the first detector 621. According to an embodiment, the processor 120 may perform a SIM reset operation for the first SIM card 226 through the second detector 622.

Figure 11:
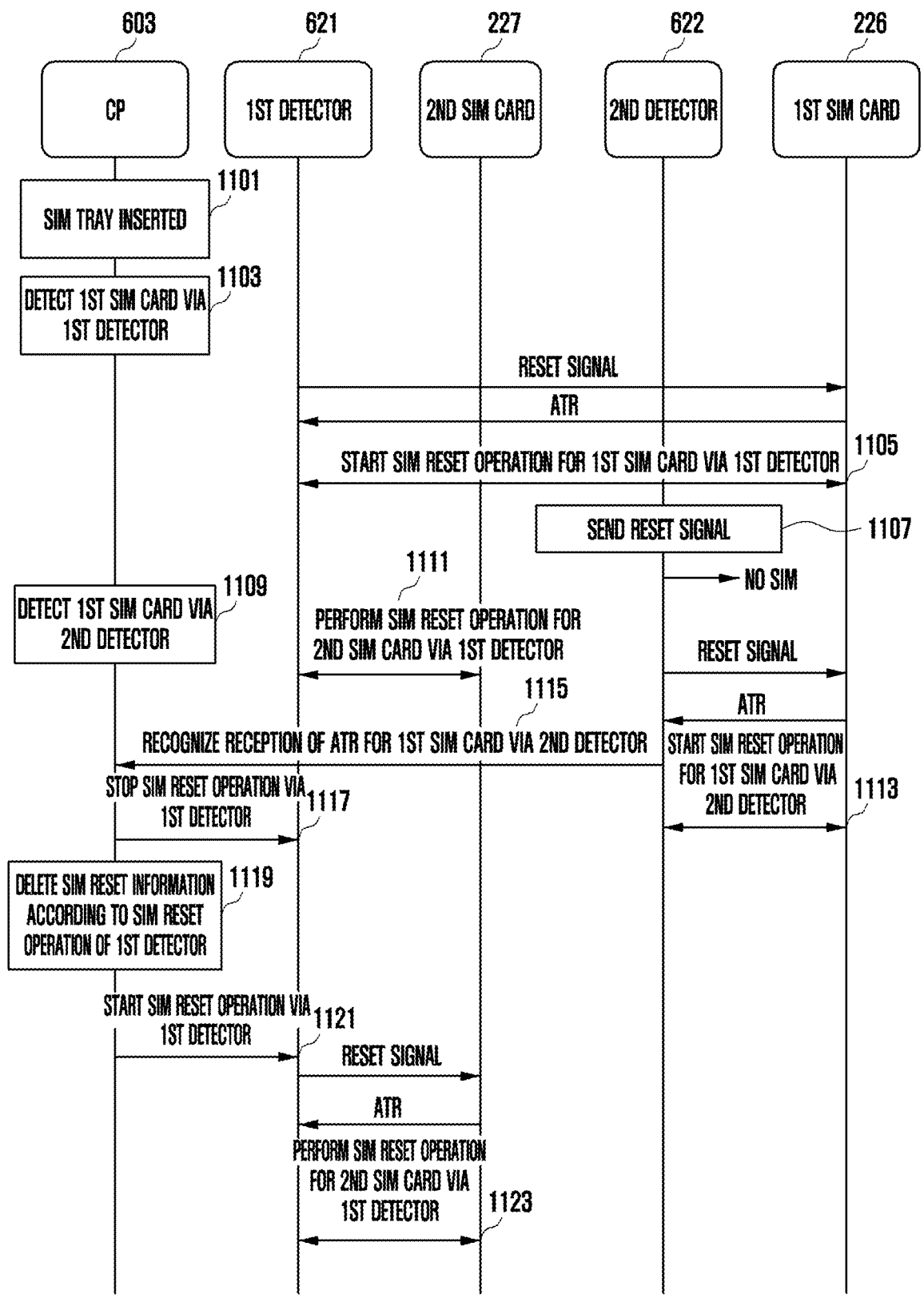
FIG. 11 illustrates a flow diagram illustrating a process of performing a first embodiment in respective components of an electronic device according to various embodiments of the disclosure.

FIG. 11 illustrates a flow diagram illustrating a process of performing a first embodiment in respective components of an electronic device according to various embodiments of the disclosure.

Referring to FIG. 11, shown as components of an electronic device (e.g., the electronic device 101 in FIG. 1) are a communication processor (CP) 603, a first detector 621, a second detector 622, a first SIM card 226, and a second SIM card 227. FIG. 11 shows a process of performing the first embodiment (using one GPIO pin) through the above components.

At operation 1101, the CP 603 of an electronic device (e.g., the electronic device 101 in FIG. 1) may detect the insertion of a SIM tray (e.g., the SIM tray 223 in FIG. 3). At operation 1103, the CP 603 may detect the first SIM card 226 loaded in the SIM tray 223 through the first detector 621. For example, the SIM tray 223 is a serial type tray in which SIM cards are loaded in a row and inserted sequentially into the electronic device 101. According to an embodiment, the SIM tray 223 may include a first slot 224 in which the first SIM card 226 is loaded, and a second slot 225 in which the second SIM card 227 is loaded.

According to an embodiment, in connection with the first SIM card 226 detected through the first detector 621, a processor 101 (e.g., the processor 120 in FIG. 1) of the electronic device 101 may enable the first detector 621 to transmit a SIM reset signal to the first SIM card 226. In response to the SIM reset signal, the first SIM card 226 may transmit an answer to reset (ATR) signal to the first detector 621. For example, the ATR signal may be a first string signal transmitted from the SIM card to the electronic device 101 in response to the SIM reset signal. The ATR signal may contain information necessary for communication, such as a SIM card type and/or a supportable transport protocol. According to an embodiment, because the electronic device 101 manages the first detector 621 and the second detector 622 together by using one GPIO pin, it is possible to transmit the SIM reset signal through the second detector 622. According to an embodiment, if a response signal (e.g., the ATR signal) to the SIM reset signal is not returned, the processor 120 may continue to transmit the SIM reset signal at given time intervals.

At operation 1105, the processor 120 may start a SIM reset operation for the first SIM card 226 through the first detector 621. At operation 1107, even if there is no SIM card detected by the second detector 622, the processor 120 may transmit the SIM reset signal at given time intervals through the second detector 622.

At operation 1109, the CP 603 may detect the first SIM card 226 through the second detector 622. Detecting the first SIM card 226 through the second detector 622 may mean that the SIM tray 223 is completely inserted into the electronic device 101.

At operation 1111, the processor 120 may perform a SIM reset operation for the second SIM card 227 through the first detector 621. The processor 120 may periodically transmit a SIM reset signal through the second detector 622, and the first SIM card 226 detected through the second detector 622 may transmit an ATR signal to the second detector 622 in response to the SIM reset signal. At operation 1113, the processor 120 may start a SIM reset operation for the first SIM card 226 through the second detector 622.

At operation 1115, the CP 603 may recognize that the ATR signal for the first SIM card 226 is received through the second detector 622. At operation 1117, the CP 603 may stop the SIM reset operation through the first detector 621. At operation 1119, the CP 603 may delete SIM reset information according to the SIM reset operation of the first detector 621. As the serial-structured SIM tray 223 is inserted into the electronic device 101, the second SIM card 227 is newly positioned in the first detector 621 while the SIM reset operation for the first SIM card 226 is being performed through the first detector 621. This may cause a malfunction in connection with the SIM reset operation for the first SIM card 226. According to an embodiment, the CP 603 may prevent the occurrence of a malfunction related to the SIM reset operation by stopping the SIM reset operation through the first detector 621 and deleting the SIM reset information related to the SIM reset operation.

At operation 1121, the CP 603 may start a SIM reset operation for the second SIM card 227 through the first detector 621. The processor 120 may transmit a SIM reset signal from the first detector 621 to the second SIM card 227, and in response to an ATR signal for the SIM reset signal, may perform a SIM reset operation for the second SIM card 227 through the first detector 621 at operation 1123.

Figure 12:
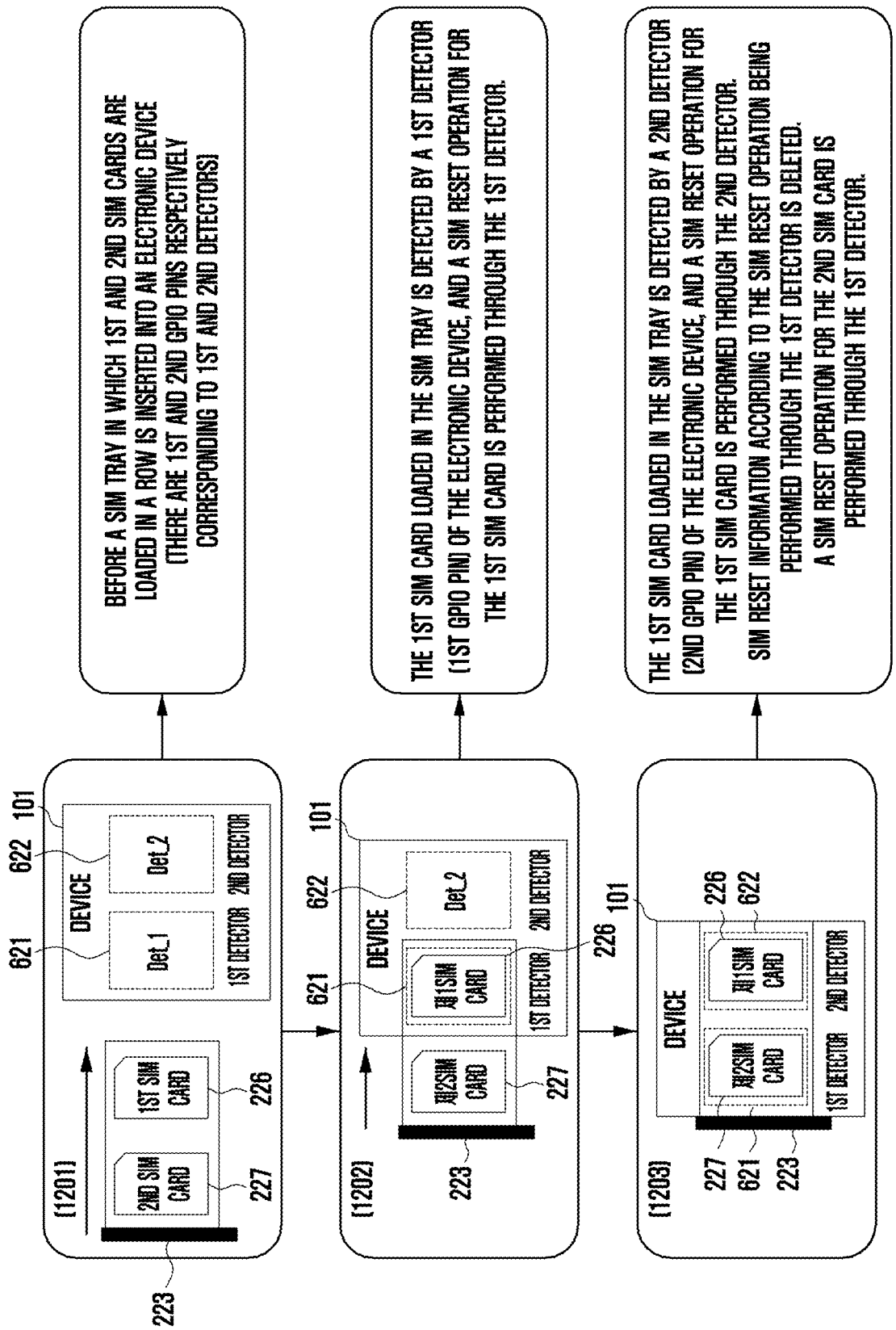
FIG. 12 illustrates a diagram illustrating a second embodiment of performing a SIM reset operation for a SIM card loaded in a SIM tray by using two GPIO pins in an electronic device according to various embodiments of the disclosure.

FIG. 12 illustrates a diagram illustrating a second embodiment of performing a SIM reset operation for a SIM card loaded in a SIM tray by using two GPIO pins in an electronic device according to various embodiments of the disclosure.

FIG. 12 shows a process of inserting the SIM tray 223 of a serial structure into the electronic device 101 and performing a SIM reset operation for the first and second SIM cards 226 and 227 loaded in the SIM tray 223 through the first and second detectors 621 and 622 of the electronic device 101. Specifically, FIG. 12 shows the above-described process as three steps.

A first step 1201 shows a situation before the serial-structured SIM tray 223 in which the first SIM card 226 and the second SIM card 227 are loaded in a row is inserted into the electronic device 101. Through the first and second detectors 621 and 622 of the SIM (e.g., the SIM 196 in FIG. 1), the electronic device 101 may detect whether the SIM tray 223 is inserted. According to an embodiment, the SIM tray 223 is a tray having a serial structure that the first SIM card 226 is first inserted into the electronic device 101 and then the second SIM card 227 is inserted into the electronic device 101. According to an embodiment, the first detector 621 may be electrically connected to a first GPIO pin to detect one SIM card, and the second detector 622 may be electrically connected to a second GPIO pin to detect another SIM card. That is, the first and second detectors 621 and 622 may be electrically connected to different GPIO pins, respectively.

A second step 1202 shows a situation in which the first SIM card 226 loaded in the SIM tray 223 is inserted into the electronic device 101 and the second SIM card 227 has not yet been inserted. According to an embodiment, the processor 120 may detect the insertion of the first SIM card 226 through the first detector 621, and then perform a SIM reset operation for the first SIM card 226 through the first detector 621. According to an embodiment, the electronic device 101 may individually transmit a SIM reset signal to each of the first and second detectors 621 and 622 by using two GPIO pins. For example, the first detector 621 may perform a SIM reset operation for the inserted first SIM card 226. According to an embodiment, the electronic device 101 may perform a SIM reset operation through the first detector 621 while the SIM tray 223 is being inserted.

A third step 1203 shows a situation in which the SIM tray 223 is completely inserted into the electronic device 101. According to an embodiment, the processor 120 may detect the insertion of the second SIM card 227 through the first detector 621, and also detect the insertion of the first SIM card 226 through the second detector 622. According to an embodiment, the processor 120 may stop the SIM reset operation for the first SIM card 226, being performed through the first detector 621, and delete information related to the SIM reset operation. Thereafter, the processor 120 may perform a SIM reset operation for the second SIM card 227 through the first detector 621. According to an embodiment, the processor 120 may perform a SIM reset operation for the first SIM card 226 through the second detector 622.

Figure 13:
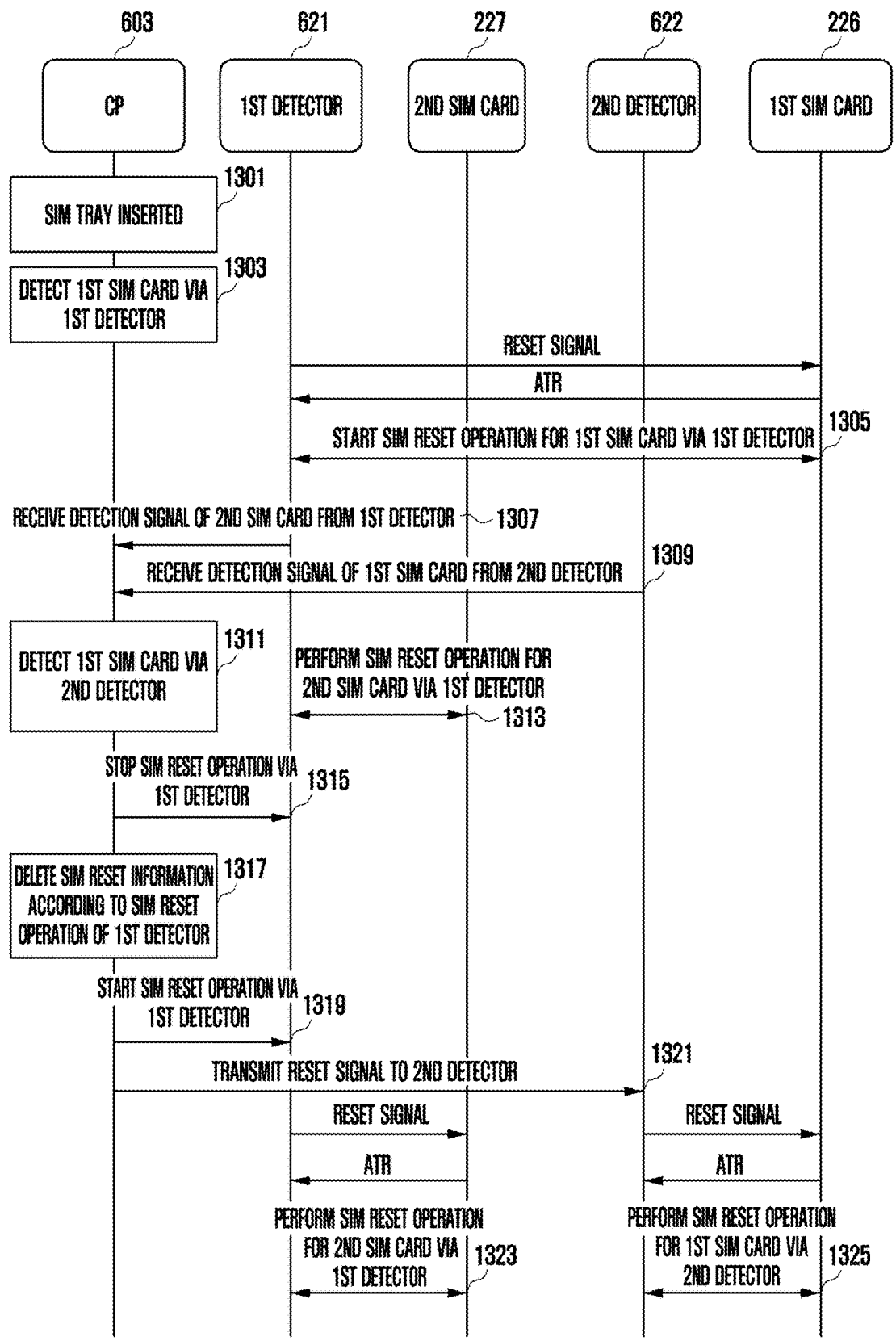
FIG. 13 illustrates a flow diagram illustrating a process of performing a second embodiment in respective components of an electronic device according to various embodiments of the disclosure.

FIG. 13 illustrates a flow diagram illustrating a process of performing a second embodiment in respective components of an electronic device according to various embodiments of the disclosure.

Referring to FIG. 13, shown as components of an electronic device (e.g., the electronic device 101 in FIG. 1) are a communication processor (CP) 603, a first detector 621, a second detector 622, a first SIM card 226, and a second SIM card 227. FIG. 13 shows a process of performing the second embodiment (using two GPIO pins) through the above components.

At operation 1301, the CP 603 of an electronic device (e.g., the electronic device 101 in FIG. 1) may detect the insertion of a SIM tray (e.g., the SIM tray 223 in FIG. 3). At operation 1303, the CP 603 may detect the first SIM card 226 loaded in the SIM tray 223 through the first detector 621. For example, the SIM tray 223 is a serial type tray in which SIM cards are loaded in a row and inserted sequentially into the electronic device 101. According to an embodiment, the SIM tray 223 may include a first slot 224 in which the first SIM card 226 is loaded, and a second slot 225 in which the second SIM card 227 is loaded.

According to an embodiment, in connection with the first SIM card 226 detected through the first detector 621, a processor 101 (e.g., the processor 120 in FIG. 1) of the electronic device 101 may enable the first detector 621 to transmit a SIM reset signal to the first SIM card 226. In response to the SIM reset signal, the first SIM card 226 may transmit an answer to reset (ATR) signal to the first detector 621. For example, the ATR signal may be a first string signal transmitted from the SIM card to the electronic device 101 in response to the SIM reset signal. The ATR signal may contain information necessary for communication, such as a SIM card type and/or a supportable transport protocol. According to an embodiment, because the electronic device 101 individually manages the first detector 621 and the second detector 622 by using two GPIO pins, only the first detector 621 may transmit the SIM reset signal for the first SIM card 226.

At operation 1305, the processor 120 may start a SIM reset operation for the first SIM card 226 through the first detector 621.

At operation 1307, the CP 603 may receive a detection signal for the second SIM card 227 from the first detector 621. At operation 1309, the CP 603 may receive a detection signal for the first SIM card 226 from the second detector 622. According to an embodiment, the first detector 621 may detect the second SIM card 227, based on the first GPIO pin, and the second detector 622 may detect the first SIM card 226, based on the second GPIO pin.

At operation 1311, the CP 603 may detect the first SIM card 226 through the second detector 622. Detecting the first SIM card 226 through the second detector 622 may mean that the SIM tray 223 is completely inserted into the electronic device 101.

At operation 1313, the processor 120 may perform a SIM reset operation for the second SIM card 227 through the first detector 621.

At operation 1315, the CP 603 may stop the SIM reset operation through the first detector 621. At operation 1317, the CP 603 may delete SIM reset information according to the SIM reset operation of the first detector 621. As the serial-structured SIM tray 223 is inserted into the electronic device 101, the second SIM card 227 is newly positioned in the first detector 621 while the SIM reset operation for the first SIM card 226 is being performed through the first detector 621. This may cause a malfunction in connection with the SIM reset operation for the first SIM card 226. According to an embodiment, the CP 603 may prevent the occurrence of a malfunction related to the SIM reset operation by stopping the SIM reset operation through the first detector 621 and deleting the SIM reset information related to the SIM reset operation.

At operation 1319, the CP 603 may start a SIM reset operation for the second SIM card 227 through the first detector 621. At operation 1321, the CP 603 may transmit a SIM reset signal to the second detector 622.

According to an embodiment, the processor 120 may transmit a SIM reset signal from the first detector 621 to the second SIM card 227, and in response to an ATR signal for the SIM reset signal, may perform a SIM reset operation for the second SIM card 227 through the first detector 621 at operation 1323.

According to an embodiment, the processor 120 may transmit a SIM reset signal from the second detector 622 to the first SIM card 226, and in response to an ATR signal for the SIM reset signal, may perform a SIM reset operation for the first SIM card 226 through the second detector 622 at operation 1325.

According to an embodiment, using two GPIO pins, the processor 120 may individually perform the SIM reset operation for each of the first and second detectors 621 and 622.

Figure 14A:
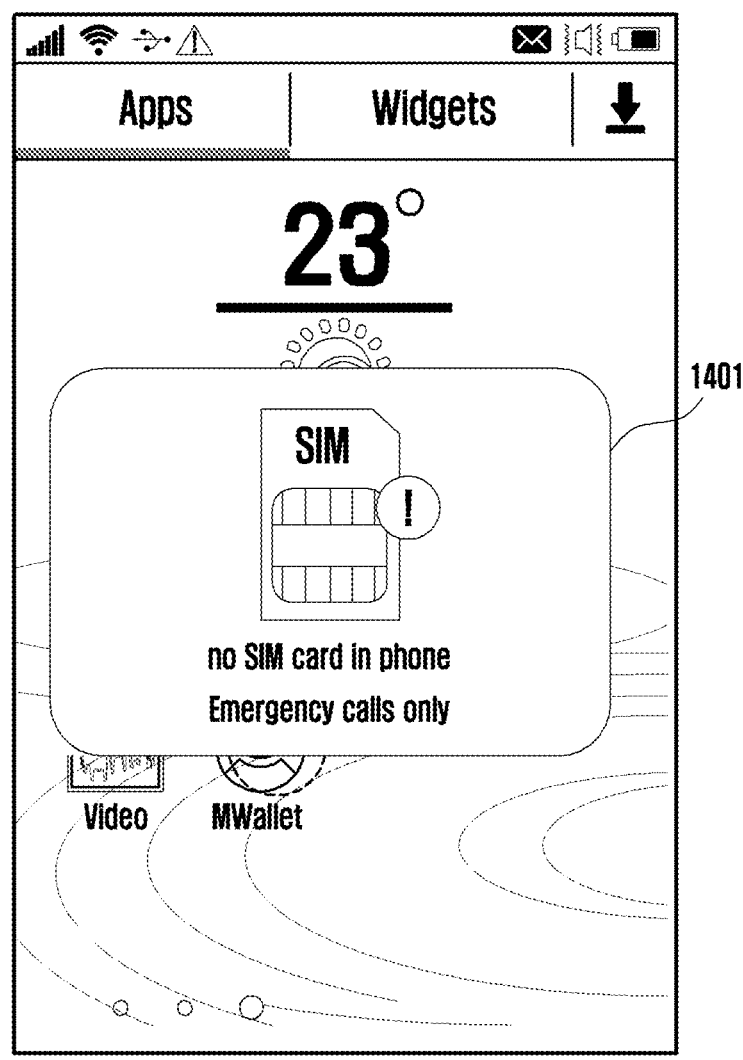
FIGS. 14A and 14B are diagrams illustrating a user interface displayed on a screen of an electronic device according to various embodiments of the disclosure.
Figure 14B:
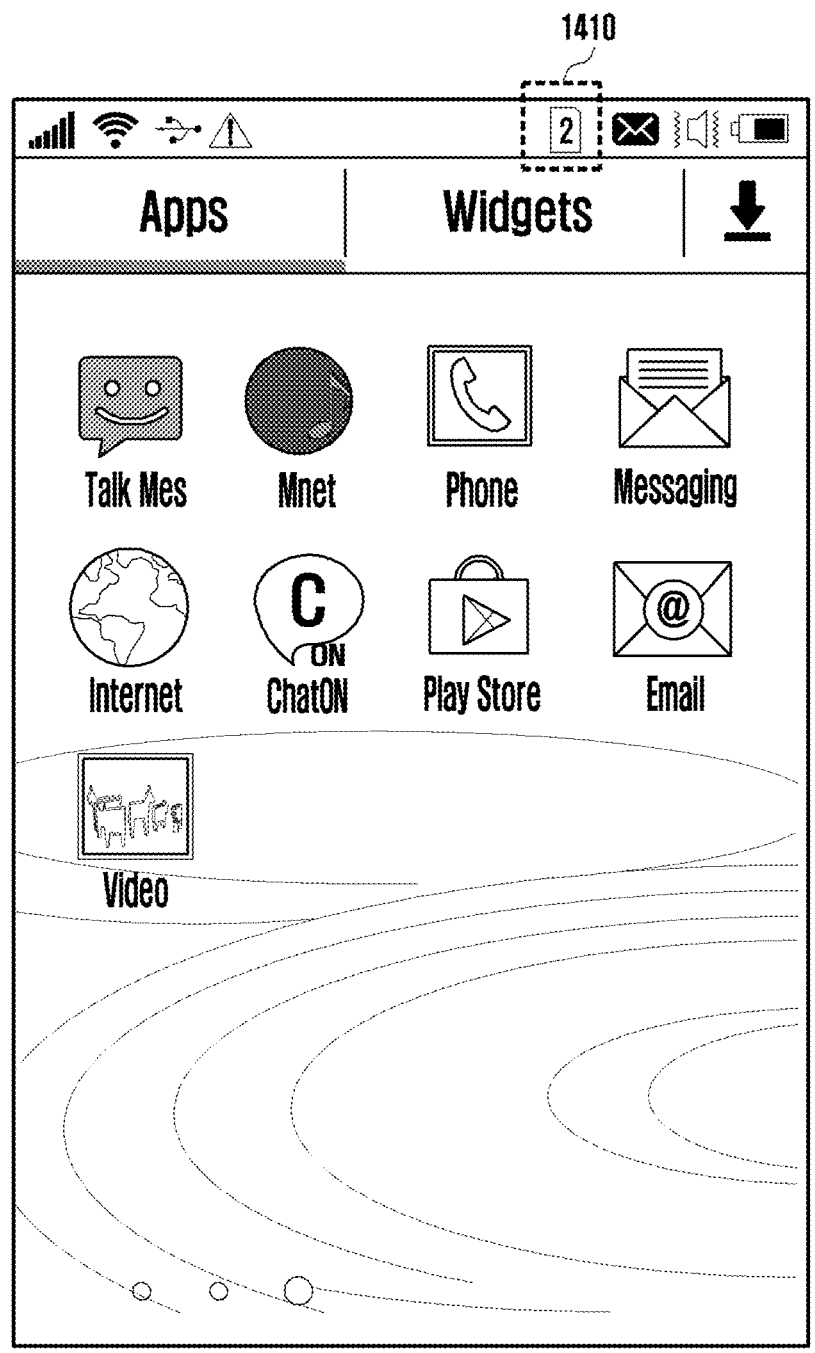

FIGS. 14A and 14B are diagrams illustrating a user interface displayed on a screen of an electronic device according to various embodiments of the disclosure.

FIG. 14A illustrates a user interface displayed on a screen (e.g., the display device 160 in FIG. 1) of an electronic device (e.g., the electronic device 101 in FIG. 1). According to an embodiment, a processor (e.g., the processor 120 in FIG. 1) of the electronic device 101 may display a notification message 1401 related to the insertion or removal of a SIM card through the screen of the electronic device 101. According to an embodiment, the processor 120 may also provide a notification about the insertion/removal of the SIM card to the user by using an audio signal through an audio output device (e.g., the sound output device 155 in FIG. 1) and/or a vibration through a haptic module (e.g., the haptic module 179 in FIG. 1).

FIG. 14B illustrates an indicator region formed in a screen of the electronic device 101. According to an embodiment, the processor 120 may display an icon 1410 related to the insertion or removal of a SIM card on the indicator region.

For example, when a plurality of SIM cards are activated and in use, the processor 120 may display the number of SIM cards in use as numbers.

According to various embodiments, a method of an electronic device may include detecting, through a subscriber identification module (SIM) detector (e.g., the SIM 196 in FIG. 6), an insertion of a SIM tray (e.g., the SIM tray 223 in FIG. 6) in which at least one SIM card (e.g., the first SIM card 226 and/or the second SIM card 227 in FIG. 6) is loaded in a row, determining whether the insertion of the SIM tray 223 is completed within a predetermined time, and performing a SIM reset operation corresponding to the at least one SIM card in response to the completed insertion of the SIM tray 223.

According to an embodiment, the SIM tray 223 may be formed in a serial structure that the at least one SIM card is loaded in a row and inserted into the electronic device one by one, and the SIM tray 223 may have at least one slot (e.g., the first slot 224 and/or the second slot 225) in which the at least one SIM card is loaded.

According to an embodiment, the SIM tray 223 may have a first slot 224 inserted first into the electronic device 101, and a second slot 225 inserted into the electronic device 101 after the first slot 224 is inserted.

According to an embodiment, the at least one SIM card may include a first SIM card 226 loaded in the first slot 224 of the SIM tray 223, and a second SIM card 227 loaded in the second slot 225 of the SIM tray 223.

According to an embodiment, the SIM detector 196 may include a first detector 621 and a second detector 622, and when the first SIM card 226 is detected through the first detector 621 and then detected through the second detector 622 within the predetermined time, the completed insertion of the SIM tray 223 may be determined.

According to an embodiment, one general-purpose input/output (GPIO) pin may be electrically connected to each of the first and second detectors 621 and 622, and an insertion or removal of each of the first and second SIM cards 226 and 227 may be detected using the one GPIO pin.

According to an embodiment, a first GPIO pin may be electrically connected to the first detector 621, a second GPIO pin may be electrically connected to the second detector 622, and an insertion or removal of the first and second SIM cards 226 and 227 may be detected individually and respectively using the first and second GPIO pins.

According to an embodiment, performing a SIM reset operation may include performing a SIM reset operation corresponding to the first SIM card 226 in response to detecting the first SIM card 226 through the first detector 621 while the SIM tray 223 is being inserted.

According to an embodiment, performing a SIM reset operation may further include stopping the SIM reset operation when the first SIM card 226 is detected through the second detector 622 while the SIM reset operation is being performed through the first detector 621, and deleting reset information according to the SIM reset operation.

According to an embodiment, performing a SIM reset operation may further include performing a SIM reset operation corresponding to the second SIM card 227 in response to detecting the second SIM card 227 through the first detector 621 after deleting the reset information.

An electronic device according to an embodiment may be one of various types of electronic devices. The electronic device may include a portable communication device (e.g., a smart phone), a computer device, a portable multimedia device, a portable medical device, a camera, a wearable device, or a home appliance. However, the electronic device is not limited to any of those described above.

Various embodiments of the disclosure and the terms used herein are not intended to limit the technological features set forth herein to particular embodiments and include various changes, equivalents, or replacements for a corresponding embodiment.

With regard to the description of the drawings, similar reference numerals may be used to refer to similar or related elements.

A singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases.

The term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

The embodiments of the disclosure disclosed in this specification and drawings only present a specific example in order to easily describe the technical contents according to an embodiment of the disclosure and to help an understanding of the embodiments of the disclosure, and they do not intend to limit the scope of the embodiments of the disclosure. Accordingly, all changes or modifications derived from the technical idea of various embodiments of the disclosure in addition to the embodiments described herein should be construed as being included in the scope of various embodiments of the disclosure without departing from the scope of the disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
a subscriber identification module (SIM) tray allowing at least one SIM card to be loaded in a row;
a SIM detector detecting the at least one SIM card, wherein the SIM detector comprises a first detector and a second detector; and
a processor operatively connected to the SIM detector, wherein the processor is configured to:
detect, through the SIM detector, an insertion of the SIM tray in which the at least one SIM card is loaded,
determine whether the insertion of the SIM tray is completed within a predetermined time, wherein in response to a first SIM card from among the at least one SIM card being detected through the first detector and then detected through the second detector within the predetermined time, the processor is further configured to determine that the insertion of the SIM tray is completed, and
perform a SIM reset operation corresponding to the at least one SIM card in response to the completed insertion of the SIM tray.

2. The electronic device of claim 1, wherein the SIM tray is formed in a serial structure that the at least one SIM card is loaded in the row on, and inserted into the electronic device one by one, and wherein the SIM tray has at least one slot in which the at least one SIM card is loaded.

3. The electronic device of claim 2, wherein the SIM tray has a first slot inserted into the electronic device, and a second slot inserted into the electronic device after the first slot is inserted.

4. The electronic device of claim 3, wherein the at least one SIM card further comprises the first SIM card loaded in the first slot of the SIM tray, and a second SIM card loaded in the second slot of the SIM tray.

5. The electronic device of claim 4, wherein the processor further comprises one general-purpose input/output (GPIO) pin electrically connected to each of the first and second detectors, and wherein the processor is further configured to detect an insertion or removal of each of the first and second SIM cards by using the one GPIO pin.

6. The electronic device of claim 4, wherein the processor further comprises a first GPIO pin electrically connected to the first detector and a second GPIO pin electrically connected to the second detector, and wherein the processor is further configured to detect an insertion or removal of the first and second SIM cards by individually and respectively using the first and second GPIO pins.

7. The electronic device of claim 1, wherein the processor is further configured to perform a SIM reset operation corresponding to the first SIM card in response to detecting the first SIM card through the first detector while the SIM tray is being inserted.

8. The electronic device of claim 7, wherein the processor stops the SIM reset operation in response to the first SIM card being detected through the second detector while the SIM reset operation is being performed through the first detector, and the processor is further configured to delete reset information according to the SIM reset operation.

9. The electronic device of claim 8, wherein the processor is further configured to perform a SIM reset operation corresponding to a second SIM card from among the at least one SIM card in response to detecting the second SIM card through the first detector after deleting the reset information.

10. The electronic device of claim 1, wherein in response to the at least one SIM card being detected through the first detector for a given time and no SIM card being detected through the second detector, the processor is further configured to determine that the insertion of the SIM tray is completed.

11. A method of an electronic device, the method comprising:
    detecting, through a subscriber identification module (SIM) detector, an insertion of a SIM tray wherein at least one SIM card is loaded in a row, wherein the SIM detector comprises a first detector and a second detector;
    determining whether the insertion of the SIM tray is completed within a predetermined time, by in response to a first SIM card from among the at least one SIM card being detected through the first detector and then detected through the second detector within the predetermined time, determining that the insertion of the SIM tray is completed; and
    performing a SIM reset operation corresponding to the at least one SIM card in response to the completed insertion of the SIM tray.

12. The method of claim 11, wherein the SIM tray is formed in a serial structure that the at least one SIM card is loaded in the row on, and inserted into the electronic device, one by one, and wherein the SIM tray has at least one slot in which the at least one SIM card is loaded.

13. The method of claim 12, wherein the SIM tray further comprises a first slot inserted into the electronic device, and a second slot inserted into the electronic device after the first slot is inserted.

14. The method of claim 13, wherein the at least one SIM card further comprises the first SIM card loaded in the first slot of the SIM tray, and a second SIM card loaded in the second slot of the SIM tray.

15. The method of claim 14, wherein one general-purpose input/output (GPIO) pin is electrically connected to each of the first and second detectors, and an insertion or removal of each of the first and second SIM cards is detected using the one GPIO pin.

16. The method of claim 14, wherein a first GPIO pin is electrically connected to the first detector, a second GPIO pin is electrically connected to the second detector, and an insertion or removal of the first and second SIM cards is detected individually and respectively using the first and second GPIO pins.

17. The method of claim 11, wherein performing a SIM reset operation further comprises performing a SIM reset operation corresponding to the first SIM card in response to detecting the first SIM card through the first detector while the SIM tray is being inserted.

18. The method of claim 17, wherein performing a SIM reset operation further comprises stopping the SIM reset operation in response to the first SIM card is detected through the second detector while the SIM reset operation is being performed through the first detector, and deleting reset information according to the SIM reset operation.

19. The method of claim 18, wherein performing a SIM reset operation further comprises performing a SIM reset operation corresponding to a second SIM card from among the at least one SIM card in response to detecting the second SIM card through the first detector after deleting the reset information.

20. The method of claim 11, wherein determining whether the insertion of the SIM tray is completed within a predetermined time further comprises:
    in response to the at least one SIM card being detected through the first detector for a given time and no SIM card being detected through the second detector, determining that the insertion of the SIM tray is completed.

* * * * *